US008249785B2

(12) United States Patent
Tokura et al.

(10) Patent No.: US 8,249,785 B2
(45) Date of Patent: Aug. 21, 2012

(54) CONTROL APPARATUS FOR VEHICULAR AUTOMATIC TRANSMISSION

(75) Inventors: Takaaki Tokura, Nagoya (JP); Hideaki Otsubo, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 571 days.

(21) Appl. No.: 12/361,897

(22) Filed: Jan. 29, 2009

(65) Prior Publication Data

US 2009/0210121 A1  Aug. 20, 2009

(30) Foreign Application Priority Data

Feb. 15, 2008  (JP) .................................. 2008-035180

(51) Int. Cl.
*G06F 19/00* (2006.01)
*F16H 3/62* (2006.01)

(52) U.S. Cl. .......... 701/55; 180/337; 180/347; 180/370; 180/374; 477/39; 477/40

(58) Field of Classification Search .................. 477/107, 477/39, 40; 701/70, 54, 51, 55; 180/337, 180/347, 370, 374
See application file for complete search history.

(56) References Cited

U.S. PATENT DOCUMENTS

| 7,568,991 | B2 | 8/2009 | Inuta |
| 2005/0049111 | A1* | 3/2005 | Takada et al. .................. 477/107 |
| 2005/0125137 | A1* | 6/2005 | Shiiba et al. ..................... 701/96 |
| 2005/0209046 | A1* | 9/2005 | Potter ............................ 477/115 |
| 2006/0217229 | A1* | 9/2006 | Ogata ............................. 477/15 |
| 2006/0270519 | A1* | 11/2006 | Kamada et al. .................... 477/3 |
| 2007/0056783 | A1* | 3/2007 | Joe et al. ....................... 180/65.2 |
| 2007/0232443 | A1* | 10/2007 | Kimura et al. .................. 477/48 |
| 2007/0275819 | A1* | 11/2007 | Hirata ............................... 477/5 |
| 2007/0287589 | A1* | 12/2007 | Kadono et al. ................ 477/110 |
| 2008/0070737 | A1* | 3/2008 | Shiohara ....................... 475/160 |

FOREIGN PATENT DOCUMENTS

| DE | 197 25 511 A1 | 12/1998 |
| JP | 1-150052 | 6/1989 |
| JP | 6-341536 | 12/1994 |
| JP | 8-93907 | 4/1996 |
| JP | 2007-100787 | 4/2007 |

OTHER PUBLICATIONS

Office Action issued Jul. 20, 2010, in Japan Patent Application No. 2008-035180 (with English-language Translation).
German Office Action issued Nov. 28, 2011 in patent application No. 10 2009 003 468.4 with English Translation.

* cited by examiner

*Primary Examiner* — Ronnie Mancho
(74) *Attorney, Agent, or Firm* — Oblon, Spivak, McClelland, Maier & Neustadt, L.L.P.

(57) ABSTRACT

A control apparatus for a vehicular automatic transmission which has a plurality of coupling elements selectively released and engaged to perform shifting actions, the control apparatus including a shift control portion configured to control at least one specially controlled coupling element which is included in the coupling elements provided to perform the shifting actions of the automatic transmission and which is placed in a fully released state prior and subsequent to the shifting action performed according to a presently generated shifting command, the shift control portion controlling each specially controlled coupling element so as to enable the specially controlled coupling element to have a torque capacity during the shifting action performed according to the presently generated shifting command.

10 Claims, 14 Drawing Sheets

|  | C1 | C2 | C3 | C4 | B1 | B2 | F1 |
|---|---|---|---|---|---|---|---|
| P |  |  |  |  |  |  |  |
| Rev1 |  |  | O |  |  | O |  |
| Rev2 |  |  |  | O |  | O |  |
| N |  |  |  |  |  |  |  |
| 1st | O |  |  |  |  | (O) | O |
| 2nd | O |  |  |  | O |  |  |
| 3rd | O |  | O |  |  |  |  |
| 4th | O |  |  | O |  |  |  |
| 5th | O | O |  |  |  |  |  |
| 6th |  | O |  | O |  |  |  |
| 7th |  | O | O |  |  |  |  |
| 8th |  | O |  |  | O |  |  |

O : ENGAGED

CONTROL APPARATUS FOR VEHICULAR AUTOMATIC TRANSMISSION

This application is based on Japanese Patent Application No. 2008-035180 filed Feb. 15, 2008, the contents of which are incorporated hereinto by reference.

BACKGROUND OF THE INVENTION

1. Field of the Invention

The present invention relates to a control apparatus for a vehicular automatic transmission configured to change a speed of a rotary motion received by an input shaft thereof and to output the rotary motion of the changed speed from an output shaft thereof.

2. Discussion of Related Art

There is known a control apparatus for an automatic transmission of a vehicle which includes hydraulically operated coupling elements and planetary gear sets and which performs shifting actions by engaging and releasing actions of the coupling elements. JP-6-341536A discloses an example of a control apparatus for such a vehicular automatic transmission. This control apparatus is configured to control a so-called "clutch-to-clutch shifting action" wherein a releasing-side coupling element which has been placed in an engaged state prior to the shifting action is released, while at the same time an engaging-side coupling element which has been placed in a released state prior to the shifting action is engaged.

It has been desired to shorten the time required to perform a shifting action of the vehicular automatic transmission, while reducing a shifting shock upon the shifting action, for improving drivability and driving comfort of the vehicle. For shortening the required shifting time, it is required to increase a rate of change of the rotating speed of an input shaft of the automatic transmission during the shifting action. To increase the rate of change of the rotating speed of the input shaft during the shifting action controlled by the control apparatus disclosed in the above-identified publication JP-6-341536A, it is required to increase a rate of increase of an engaging force of the engaging-side coupling element. However, an increase of the rate of increase of the engaging force undesirably results in an increase of the shifting shock. Thus, the control apparatus of the above-identified publication suffers from difficulty in shortening the required shifting time without an increase of the shifting shock.

SUMMARY OF THE INVENTION

It is therefore an object of the present invention to provide a control apparatus for a vehicular automatic transmission, which control apparatus permits reduction of the required shifting time of the automatic transmission while reducing the shifting shock.

The above object may be achieved according to any one of the following modes of this invention. It is to be understood that the present invention is not limited to the technical features or any combinations thereof which will be described for illustrative purpose only. It is to be understood that a plurality of elements or features included in any one of the following modes of the invention are not necessarily provided all together, and that the invention may be embodied without some of the elements or features described with respect to the same mode.

(1) A control apparatus for a vehicular automatic transmission which has a plurality of coupling elements which are selectively released and engaged to perform shifting actions, the control apparatus comprising:

a shift control portion configured to control at least one specially controlled coupling element which is included in the plurality of coupling elements provided to perform the shifting actions of the vehicular automatic transmission and which is placed in a fully released state prior and subsequent to the shifting action performed according to a presently generated shifting command, the shift control portion controlling each of the at least one specially controlled coupling element so as to enable each specially controlled coupling element to have a torque capacity during the shifting action performed according to the presently generated shifting command.

The control apparatus constructed according to the mode (1) of the present invention described above is configured to enable at least one specially controlled coupling element to have a torque capacity during the shifting action performed according to the presently generated shifting command. The torque capacity of the specially controlled coupling element has a larger influence on a change of a rotating speed of an input shaft of the vehicular automatic transmission, than the torque capacity of the coupling element to be engaged to perform the shifting action according to the shifting command, so that the specially controlled coupling element enabled to have the torque capacity makes it possible to more rapidly change the rotating speed of the input shaft to a value corresponding to a gear position of the vehicular automatic transmission established after the shifting action, than in the case where the specially controlled coupling element is not enabled to have the torque capacity, while at the same time a shifting shock of the vehicular automatic transmission is reduced effectively as in the above-indicated case, whereby the time required for completion of the shifting action can be effectively shortened.

(2) The control apparatus according to the above-described mode (1), wherein the shifting action performed according to the presently generated shifting command is a shift-up action of the vehicular automatic transmission, and each of the at least one specially controlled coupling element is a higher-gear-position coupling element which is engaged to perform the shifting action of the vehicular coupling element to a higher gear position than a gear position established after the shift-up action.

In the above-described mode (2) of the invention wherein each specially controlled coupling element is the higher-gear-position coupling element which is engaged to perform the shifting action to a higher gear position than the gear position established by a shift-up action of the vehicular automatic transmission, the time required for completion of the shift-up action can be made shorter than in the case where the higher-gear-position coupling element is not enabled to have a torque capacity, while the shifting shock can be reduced effectively as in the above-indicated case.

(3) The control apparatus according to the above-described mode (1), wherein the shifting action performed according to the presently generated shifting command is a shift-down action of the vehicular automatic transmission, and each of the at least one specially controlled coupling element is an intermediate-gear-position coupling element which is engaged to perform the shifting action of the vehicular coupling element to an intermediate gear position intermediate between a gear position established before the shift-down action and a gear position established after the shift-down action.

In the control apparatus according to the mode (3) of the invention wherein each specially controlled coupling element is the intermediate-gear-position coupling element which is engaged to perform the shifting action to an intermediate gear position intermediate between the gear position established before a shift-down action of the vehicular automatic transmission and the gear position established after the shift-down action, the time required for completion of the shift-down action can be made shorter than in the case where the intermediate-gear-position coupling element is not enabled to have a torque capacity, while the shifting shock can be reduced effectively as in the above-indicated case.

(4) The control apparatus according to any one of the above-described modes (1)-(3), further comprising a shifting progress determining portion configured to determine whether a degree of progress of the shifting action according to the presently generated shifting action has reached a predetermined target shifting progress degree, and wherein the shift control portion controls the at least one specially controlled coupling element to reduce the torque capacity when the shifting progress determining portion has determined that the degree of progress of the shifting action has reached the predetermined target shifting progress degree.

In the control apparatus according to the mode (4) of the invention, the shift control portion controls the at least one specially controlled coupling element to reduce the torque capacity when the shifting progress determining portion has determined that the degree of progress of the shifting action has reached the predetermined target shifting progress degree. Thus, the torque capacity of the specially controlled coupling element is more slowly lowered during the shifting action and zeroed upon termination of the shifting action, than in the case where the reduction of the torque capacity to zero is initiated immediately before the moment of termination of the shifting action, so that an inadequate control timing of the torque capacity of the specially controlled coupling element which would take place during the shifting action would have a reduced adverse influence on the shifting action.

(5) The control apparatus according to the above-described mode (4), wherein the shifting progress determining portion determines that the degree of progress of the shifting action according to the presently generated shifting action has reached the predetermined target shifting progress degree when a rotating speed of an input shaft of the vehicular automatic transmission has reached a threshold value determined on the basis of the rotating speeds of the input shaft upon initiation and termination of an inertia phase of the shifting action such that the threshold value corresponds to the predetermined target shifting progress degree.

(6) The control apparatus according to the above-described mode (4) or (5), wherein the predetermined target shifting progress degree is determined so that the degree of progress of the shifting action has reached the predetermined target shifting progress degree within the inertia phase.

(7) The control apparatus according to the above-described mode (6), wherein the predetermined target shifting progress degree is determined so that the degree of progress of the shifting action has reached the predetermined target shifting progress degree after a change of a torque of an output shaft of the vehicular automatic transmission which takes place as a shifting shock of the vehicular automatic transmission upon or immediately after initiation of the inertia phase has been terminated.

In the above-described mode (6) or (7) of the invention, the required shifting time of the vehicular automatic transmission can be effectively shortened while reducing an influence of an inadequate control timing of the torque capacity of the at least one specially controlled coupling element, upon the shifting action performed according to the presently generated shifting command, while the torque capacity is generated temporarily for a selected length of time during the shifting action.

(8) The control apparatus according to any one of the above-described modes (1)-(7), wherein the shift control portion enables the at least one specially controlled coupling element to have the torque capacity in synchronization with a moment of initiation of an inertia phase of the vehicular automatic transmission.

In the above-described mode (8) of the invention wherein the at least one specially controlled coupling element is enabled to have the torque capacity in synchronization with the moment of initiation of the inertia phase of the vehicular automatic transmission, the torque capacity of the at least one specially controlled coupling element can be effectively generated to shorten the required shifting time of the vehicular automatic transmission.

(9) The control apparatus according to any one of the above-indicated modes (1)-(8), wherein the shifting action of the vehicular automatic transmission performed according to the presently generated shifting action is a shift-up action from a first gear position to a second gear position, which shift-up action is performed by releasing a first coupling element which is included in the plurality of coupling elements and which has been placed in a fully engaged state to place the vehicular automatic transmission in the first gear position, and engaging a second coupling element which is included in the plurality of coupling elements and which has been placed in a fully released state in the first gear position of the vehicular automatic transmission, the shift control portion enabling the at least one specially controlled coupling element to have the torque capacity during the shift-up action of the vehicular automatic transmission.

In the above-described mode (9) of the invention, the shift control portion enables the at least one specially controlled coupling element to have the torque capacity during a shift-up action of the vehicular automatic transmission from the first gear position to the second gear position, which shift-up action is performed by releasing the first coupling element which has been placed in the fully engaged state to place the vehicular automatic transmission in the first gear position, and engaging the second coupling element which has been placed in the fully released state in the first gear position of the vehicular automatic transmission. In this mode of the invention, the specially controlled coupling element enabled to have the torque capacity makes it possible to more rapidly change the rotating speed of the input shaft of the vehicular automatic transmission to a value corresponding to the second gear position of the vehicular automatic transmission established after the shift-up, than in the case where the specially controlled coupling element is not enabled to have the torque capacity, while at the same time a shifting shock of the vehicular automatic transmission is reduced effectively as in the above-indicated case, whereby the time required for completion of the shift-up action can be effectively shortened.

(10) The control apparatus according to any one of the above-described modes (1)-(9), wherein the shift control portion enables the at least one specially controlled coupling element to have the torque capacity, by temporarily placing the at least one specially controlled coupling element in a slipping state during the shifting action of the vehicular automatic transmission performed according to the presently generated shifting command.

In the above-described mode (10) of the invention, the shift control portion enables at least one specially controlled coupling element to have the torque capacity by temporarily placing it in the slipping state during the shifting action of the vehicular automatic transmission. In this mode of the invention, the torque capacity of each specially controlled coupling element temporarily placed in the slipping state can be adequately adjusted to a value suitable for shortening the required shifting time of the vehicular automatic transmission, while reducing the shifting shock of the vehicular automatic transmission.

(11) The control apparatus according to the above-described mode (10), wherein the shift control portion controls the torque capacity of the at least one specially controlled coupling element placed in the slipping state, and a torque capacity of the coupling element to be engaged to perform the shifting action according to the presently generated shifting command, in a predetermined relationship with each other such that rotating speeds of an input shaft and an output shaft of the vehicular automatic transmission are changed at respective predetermined target rates.

(12) The control apparatus according to any one of the above-described modes (1)-(11), wherein the torque capacity of each of the plurality of coupling elements increases as an engaging action of each coupling element progresses.

(13) The control apparatus according to the above-described mode (3), wherein the shift control portion enables the intermediate-gear-position coupling element to have the torque capacity for a time period during the shift-down action of the vehicular automatic transmission, which time period ends at a point of time at which synchronous rotary motions of an input member and an output member of the intermediate-gear-position coupling element are confirmed, the shift control portion controlling the intermediate-gear-position coupling element such that the intermediate-gear-position coupling element is not enabled to have the torque capacity after the synchronous rotary motions of the input and output members have been confirmed.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENTS

<First Embodiment>

Figures 1, 2:
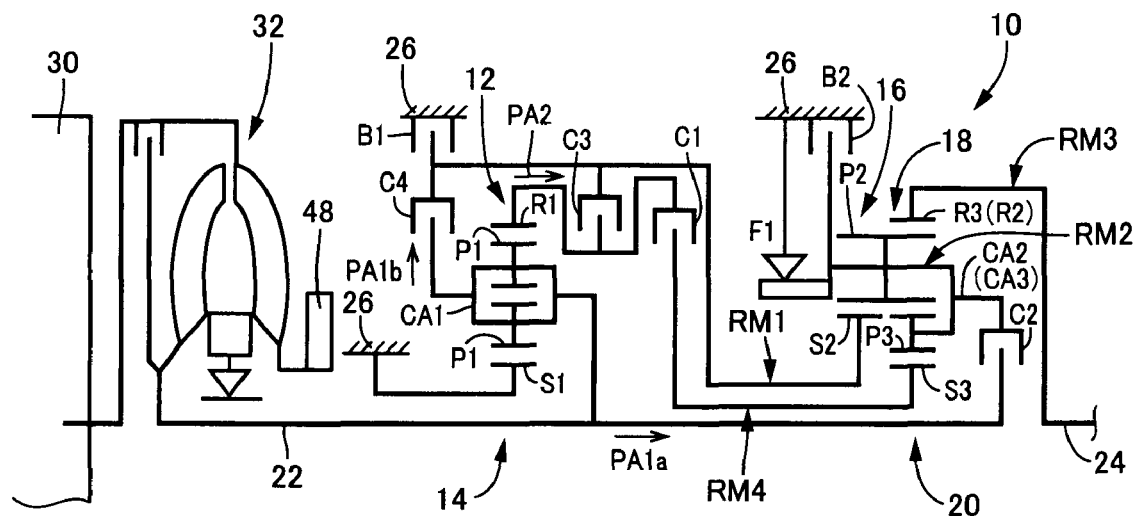
FIG. 1 is a schematic view illustrating a vehicular automatic transmission controlled by a control apparatus constructed according to the present invention.
FIG. 2 is a table indicating a relationship between a plurality of gear positions of the automatic transmission of FIG. 1 and combinations of operating states of coupling elements to establish the respective gear positions.

Referring to first to the schematic view of FIG. 1, there is illustrated an arrangement of a vehicular automatic transmission 10, which is controlled by a control apparatus according to the present invention. As shown in FIG. 1, the automatic transmission 10 includes a first transmission portion 14 constituted principally by a first planetary gear set 12 of a double-pinion type, and a second transmission portion 20 constituted principally by a second planetary gear set 16 of a single-pinion type and a third planetary gear set 18 of a double-pinion type. The first transmission portion 14 and the second transmission portion 20 are disposed coaxially with each other within a stationary member in the form of a transmission casing 26 and are connected to an input shaft 14, and the second transmission portion 20 is connected to an output shaft 24, so that the speed of a rotary motion of the input shaft 22 is changed by the first and second transmission portions 14, 20, into the speed of a rotary motion of the output shaft 24. The input shaft 22, which is an input member of the automatic transmission 10, is a turbine shaft of a torque converter 32 rotated by a drive power source of a vehicle in the form of an engine 30, while the output shaft 24 is an output member of the automatic transmission 10, which is operatively connected to right and left drive wheels of the vehicle through a differential gear device (final speed reduction device) and a pair of axles (not shown). Since the automatic transmission 10 is constructed symmetrically with respect to its axis, the lower half of the automatic transmission 10 located below the axis is omitted in the schematic view of FIG. 1.

The first planetary gear set 12 of the first transmission portion 14 has a sung gear S1, a plurality of pairs of mutually meshing pinion gears P1, a carrier CA1 supporting the pinion gears P1 such that each pinion gear P1 is rotatable about its axis and about the axis of the first planetary gear set 12, and a ring gear R1 meshing with the sun gear S1 through the pinion gears P1. The sun gear S1, carrier CA1 and ring gear R1 constitute three rotary elements of the first planetary gear set 12. The carrier CA1 is integrally fixed to the input shaft 22 and rotated with the input shaft 22, and the sun gear S1 is integrally fixed to the transmission casing 26. The ring gear R1 functions as an intermediate output member, and the rotating speed of the ring gear R1 is reduced with respect to that of the input shaft 22. A rotary motion of the ring gear R1 is transmitted to the second transmission portion 20. In the present embodiment, the rotary motion of the input shaft 22 is transmitted to the second transmission portion 20 at a speed ratio of 1.0 through first intermediate output paths PA1, which consist of a direct path PA1$a$ through which the rotary motion of the input shaft 22 is transmitted directly to the second transmission portion 20, without via the first planetary gear set 12, and an indirect path PA1$b$ through which the rotary motion of the input shaft 22 is transmitted to the second transmission portion 20 through the carrier CA1 of the first planetary gear set 12. Further, the rotary motion of the input shaft 22 is transmitted to the second transmission portion 20 at a speed ratio higher than 1.0 through a second intermediate output path PA2, that is, through the carrier CA1, the pinion gears P1 supported by the carrier CA1, and the ring gear R1, such that the speed of the rotary motion transmitted to the second transmission portion 20 is reduced with respect to the rotating speed of the input shaft 22.

The second planetary gear set 16 has a sun gear S2, a pinion gear P2, a carrier CA2 supporting the pinion gear P2 such that the pinion gear P2 is rotatable about its axis and about the axis of the second planetary gear set 16, and a ring gear meshing with the sun gear S2 through the pinion gear P2. The third planetary gear set 18 as a sun gear S3, a plurality of pairs of mutually meshing pinion gears P2, P3, a carrier CA3 supporting the pinion gears P2, P3 such that each pinion gear P2,P3 is rotatable about its axis and about the axis of the third planetary gear set 18, and a ring gear R3 meshing with the sun gear S3 through the pinion gears P2, P3.

The second and third planetary gear sets 16, 18 have rotary elements some of which are fixed to each other to provide four rotary elements RM1-RM4. Described in detail, the sun gear S2 of the second planetary gear set 16 functions as a first rotary element RM1, and the carrier CA2 of the second planetary gear set 16 and the carrier CA3 of the third planetary gear set 18 are integrally fixed to each other to constitute a second rotary element RM2. The ring gear R2 of the second planetary gear set 16 and the ring gear R3 of the third planetary gear set 18 are integrally fixed to each other to constitute a third rotary element RM3, and the sun gear S3 of the third planetary gear set 18 functions as a fourth rotary element RM4. The second and third planetary gear sets 16, 18 use a single member functioning as the carrier CA2 and the carrier CA3, and another single member functioning as the ring gear R2 and the ring gear R3, and cooperate to constitute a Ravigneaux type planetary gear train wherein the pinion gear P2 of the second planetary gear set 16 also functions as one of the pinion gears of the third planetary gear set 18.

The first rotary element RM1 (sun gear S2) is selectively fixed through a first brake B1 to the transmission casing 26, and is selectively connected through a third clutch C3 to an intermediate output member in the form of the ring gear R1 of the first planetary gear set 12 (that is, to the second intermediate output path PA2). Further, the first rotary element RM1 is selectively connected through a fourth clutch C4 to the carrier CA1 of the first planetary gear set 12 (that is, to the direct path PA1$b$ of the first intermediate output paths PA1). The second rotary element RM2 (carriers CA2 and CA3) is selectively fixed through a second brake B2 to the transmission casing 26, and is selectively connected through a second clutch C2 to the input shaft 22 (that is, to the direct path PA1$a$ of the first intermediate output paths PA1). The third rotary element RM3 (ring gears R2 and R3) is integrally fixed to the output shaft 24. The fourth rotary element RM4 (sun gear S3) is selectively connected through a first clutch C1 to the ring gear R1. Between the second rotary element RM2 and the transmission casing 26, there is disposed a one-way clutch F1 in parallel with the second brake B2. This one-way clutch F1 permits a rotary motion of the second rotary element RM2 in the forward direction (in the direction of rotation of the input shaft 22), but inhibits a rotary motion of the second rotary element RM2 in the reverse direction.

Figure 3:
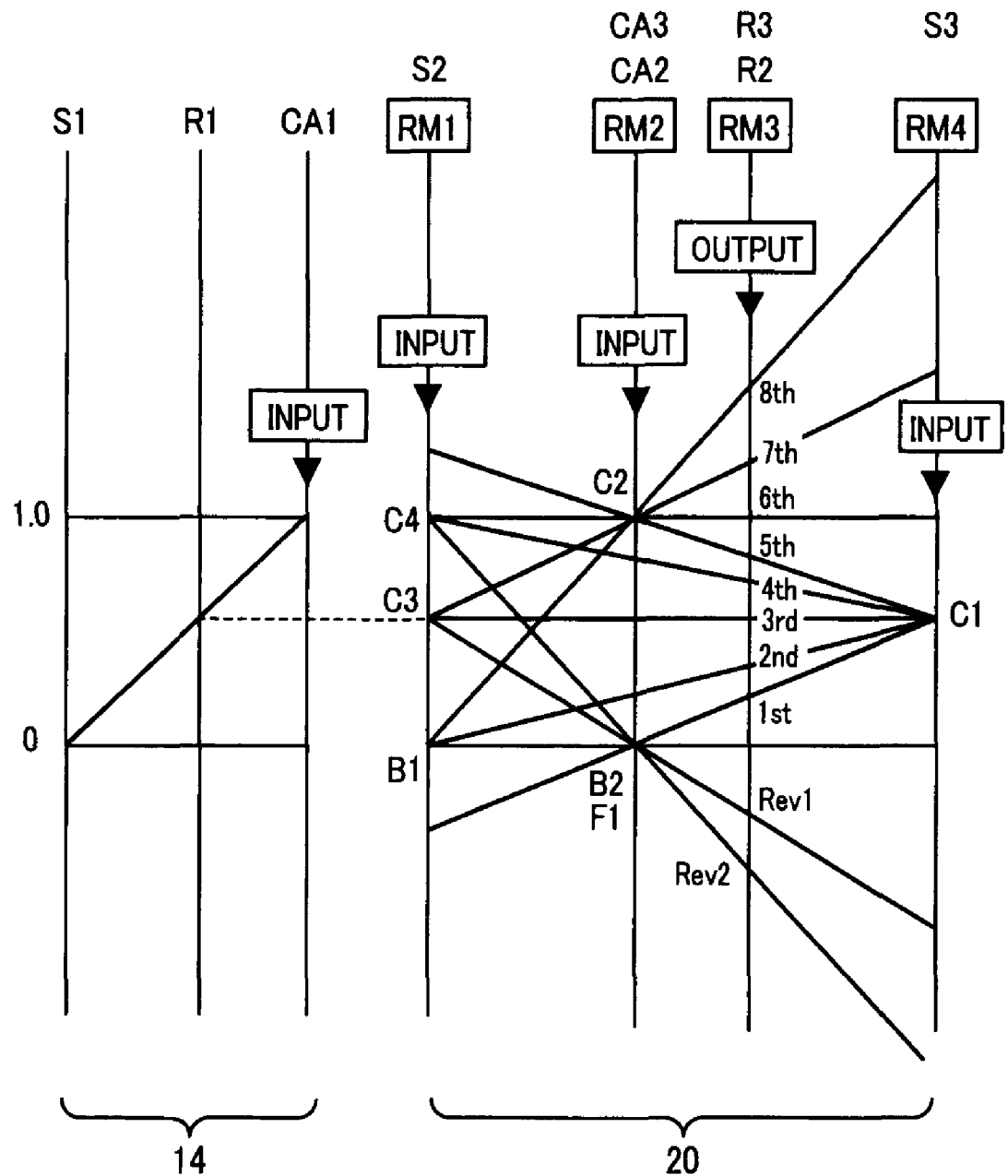
FIG. 3 is a collinear chart indicating by straight lines relative rotating speeds of a plurality of rotary elements of the vehicular automatic transmission of FIG. 1 placed in each gear position.

The collinear chart of FIG. 3 indicates, by straight lines, the rotating speed of each element of the first and second transmission portions 14, 20 in each of the gear positions of the automatic transmission 10. The collinear chart has a lower horizontal straight line indicating the speed "0", and an upper horizontal straight line indicating the speed "1.0", namely, the rotating speed of the input shaft 22. The collinear chart further has three vertical straight lines corresponding to the first transmission portion 14, and four vertical straight lines corresponding to the second transmission portion 20. The three vertical straight lines corresponding to the first transmission portion 14 respectively represent the sun gear S1, ring gear R1 and carrier CA1, in the order from the left side toward the right side. The distances between the adjacent ones of the those three vertical lines are determined by a gear ratio ρ1 of the first planetary gear set 12, which is a ratio of the number of teeth of the sun gear S1 to the number of teeth of the ring gear R1. The four vertical straight lines corresponding to the second transmission portion 20 respectively represent the first rotary element RM1 (sun gear S2), the second rotary element RM2 (carriers CA2, CA3), the third rotary element RM3 (ring gears R2, R3) and the fourth rotary element (sun gear S3), in the order from the left side toward the right side. The distances between the adjacent ones of those four vertical lines are determined by a gear ratio ρ2 of the second planetary gear set 16 and a gear ratio ρ3 of the third planetary gear set 18.

As indicated in FIG. 3, the automatic transmission 10 is placed in a first gear position "1st" when the first clutch C1 and the second brake B2 are engaged. The first gear position "1st" has a highest speed ratio (a ratio of a rotating speed of the input shaft 22 to a rotating speed of the output shaft 24). In this first gear position, the fourth rotary element RM4 is decelerated by the first transmission portion 14 with respect to the input shaft 22, while the second rotary element RM2 is held stationary, so that the output shaft 24 connected to the third rotary element RM3 is rotated at a speed represented by an inclined straight line labeled "1st" in the collinear chart of FIG. 3.

When the first clutch C1 and the first brake B1 are engaged, the automatic transmission 10 is placed in a second gear position "2nd" having a speed ratio lower than that of the first gear position "1st". In the second gear position "2nd", the fourth rotary element RM4 is decelerated by the first transmission portion 14 with respect to the input shaft 22, while the first rotary element RM1 is held stationary, so that the third rotary element RM3 is rotated at a speed represented by an inclined straight line labeled "2nd" in the collinear chart.

When the first clutch C1 and the third clutch C3 are engaged, the automatic transmission 10 is placed in a third gear position "3rd" having a speed ratio lower than that of the second gear position "2nd". In the third gear position "3rd", the fourth rotary element RE4 and the first rotary element RM1 are decelerated by the first transmission portion 14 with respect to the input shaft 22, while the second transmission portion 20 is rotated as a unit, so that the third rotary element RM3 is rotated at a speed represented by a horizontal straight line labeled "3rd" in the collinear chart, that is, at the same speed as the ring gear R1.

When the first clutch C1 and the fourth clutch C4 are engaged, the automatic transmission 10 is placed in a fourth gear position "4th" having a speed ratio lower than that of the third gear position "3rd". In the fourth gear position "4th", the fourth rotary element RM4 is decelerated by the first transmission portion 14 with respect to the input shaft 22, while the first rotary element RM1 and the input shaft 22 are rotated together, so that the third rotary element RM3 is rotated at a speed represented by an inclined straight line labeled "4th" in the collinear chart.

When the first clutch C1 and the second clutch C2 are engaged, the automatic transmission 10 is placed in a fifth gear position "5th" having a speed ratio lower than that of the fourth speed position "4th". In the fifth gear position "5th", the fourth rotary element RM4 is decelerated by the first transmission portion 14 with respect to the input shaft 22, while the second rotary element RM2 and the input shaft 22 are rotated together, so that the third rotary element RM3 is rotated at a speed represented by an inclined straight line labeled "5th" in the collinear chart.

When the second clutch C2 and the fourth clutch C4 are engaged, the automatic transmission 10 is placed in a sixth gear position "6th" having a speed ratio lower than that of the fifth gear position "5th". In the sixth gear position "6th", the second transmission portion 20 is rotated with the input shaft 20, so that the third rotary element RM3 is rotated at a speed represented by a horizontal straight line labeled "6th" in the collinear chart, that is, at the same speed as the input shaft 22. The speed ratio of the sixth gear position "6th" is equal to 1.0.

When the second clutch C2 and the third clutch C3 are engaged, the automatic transmission 10 is placed in a seventh gear position "7th" having a speed ratio lower than that of the sixth gear position "6th". In the seventh gear position "7th", the first rotary element RM1 is decelerated by the first transmission portion 14 with respect to the input shaft 22, while the second rotary element RM2 and the input shaft 22 are rotated together, so that the third rotary element RM3 is rotated at a speed represented by an inclined straight line labeled "7th" in the collinear chart.

When the second clutch C2 and the first brake B1 are engaged, the automatic transmission 10 is placed in an eighth gear position "8th" having a speed ratio lower than that of the seventh gear position "7th". In the eighth gear position "8th", the second rotary element RM2 and the input shaft 22 are rotated together, while the first rotary element RM1 is held stationary, so that the third rotary element RM3 is rotated at a speed represented by an inclined straight line labeled "8th" in the collinear chart.

When the third clutch C3 and the second brake B2 are engaged, the automatic transmission 10 is placed in a first reverse gear position "Rev1" in which the first rotary element RM1 is decelerated by the first transmission portion 14, while the second rotary element RM2 is held stationary, so that the third rotary element RM3 is rotated in the reverse direction at a speed represented by an inclined straight line labeled "Rev1" in the collinear chart. When the fourth clutch C4 and the second brake B2 are engaged, the automatic transmission 10 is placed in a second reverse gear position "Rev2" which has a speed ratio lower than that of the first reverse gear position "Rev1" and in which the first rotary element RM1 and the input shaft 22 are rotated together, while the second rotary element RM2 is held stationary, so that the third rotary element RM3 is rotated in the reverse direction at a speed represented by an inclined straight line labeled "Rev2" in the collinear chart. The first and second reverse gear positions "Rev1" and "Rev2" correspond to the first and second gear positions "1st" and "2nd".

The table of FIG. 2 indicates the relationship between the gear positions "1st" through "8th", "Rev1" and "Rev2" of the automatic transmission 10 and the respective combinations of the operating states of the clutches C1-C4 and brakes B1 and B2. In the table, a sign "O" represents the engaged state of the clutches and brakes, while a sign "(O)" represents the engaged state of the second brake B2 which is established to apply an engine brake to the vehicle. The absence of the signs "O" and "(O)" indicates the released state of the clutches and brakes. In the presence of the one-way clutch F1 disposed in parallel with the second brake B2 which is engaged to establish the first gear position "1st", the second brake B2 need not be engaged to start or accelerate the vehicle with the automatic transmission 10 placed in the first gear position "1st". The speed ratios of the individual gear positions "1st" through "8th", "Rev1" and "Rev2" are determined by the gear ratios $\rho 1$, $\rho 2$ and $\rho 3$ of the first, second and third planetary gear sets 12, 16, 18.

As described above, the automatic transmission 10 which includes the first transmission portion 14 having the two intermediate output paths PA1, PA2 having the respective different speed ratios and the second transmission portion 20 having the two planetary gear sets 16, 18 has a total of eight forward-drive gear positions, which are selectively established by the selective engaging actions of the four clutches C1-C4 and two brakes B1, B2. Accordingly, the automatic transmission 10 is small-sized and can be installed on the vehicle with a high degree of freedom and flexibility. As is apparent from the table of FIG. 2, one of the gear positions is selected by concurrently engaging and releasing the respective two coupling elements selected from the clutches C1-C4 and brakes B1, B2. The above-described clutches C1-C4 and brakes B1 and B2 (hereinafter collectively referred to as "clutches" and "brakes" unless otherwise specified) are hydraulically operated frictional coupling elements, each of which may be a multiple-disc clutch or brake having a plurality of mutually superposed friction plates which are forced against each other by a hydraulic actuator.

Figure 4:
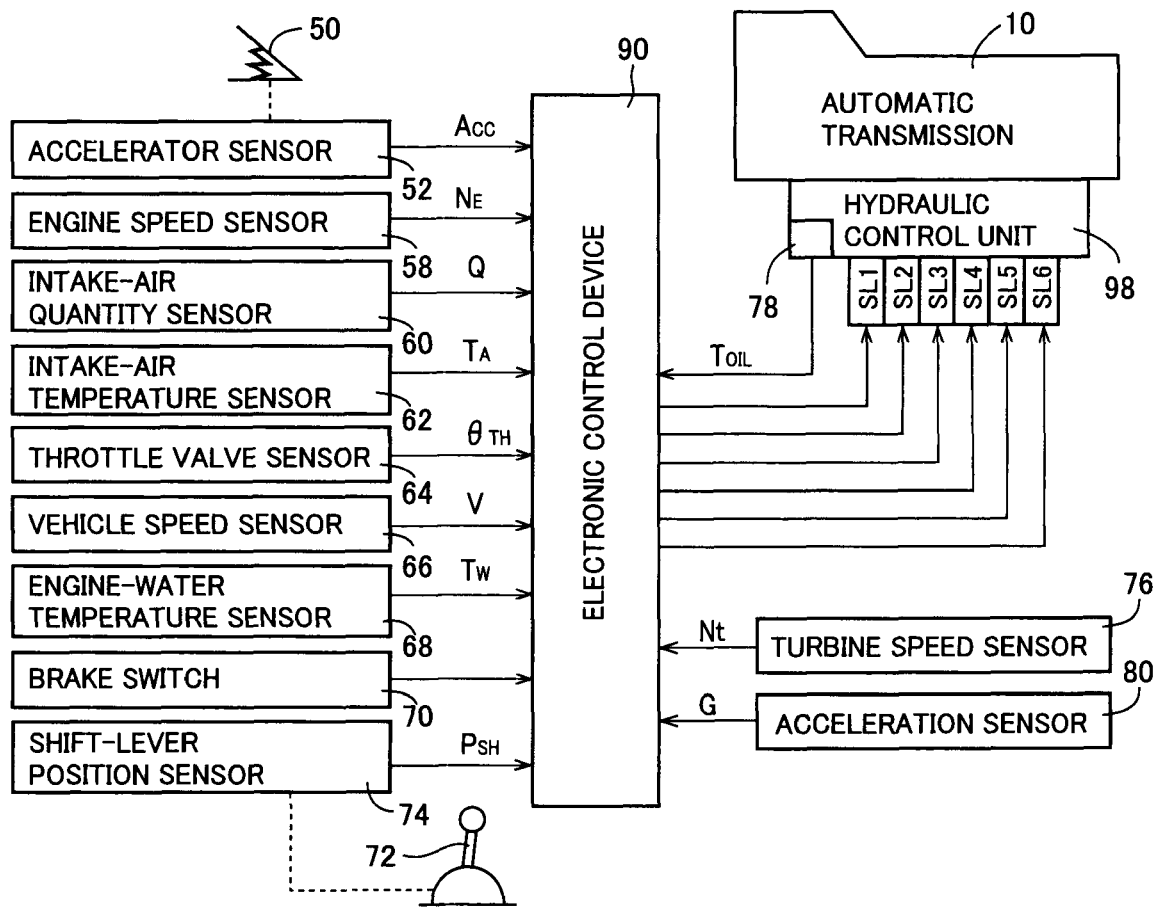
FIG. 4 is a block diagram showing major elements of a control system for controlling the vehicular automatic transmission of FIG. 1.

Referring to the block diagram of FIG. 4 illustrating a control system provided to control the automatic transmission 10 and other devices of the vehicle, the control system includes an electronic control device 90 principally constituted by a so-called microcomputer incorporating a CPU, a RAM, a ROM and an input/output interface. The CPU operates to perform signal processing operations according to control programs stored in the ROM, while utilizing a temporary data storage function of the RAM, for controlling the output of the engine 30, and the shifting operation of the automatic transmission 10. The electronic control device 90 may include an engine control portion and a transmission control portion which control the engine 30 and automatic transmission 10, respectively.

The control system includes an accelerator sensor 52 operable to detect an operating amount $A_{CC}$ of an accelerator pedal 50 and applies a signal indicative of the operating amount $A_{CC}$ to the electronic control device 90. The accelerator pedal 50, which is operated by the vehicle operator by an amount corresponding to a vehicle output required by the operator, is considered to function as a vehicle accelerating member, and the operating amount $A_{CC}$ corresponds to the vehicle output required by the vehicle operator.

The control system further includes: an engine speed sensor 58 operable to detect an operating speed $N_E$ of the engine 30; an intake-air quantity sensor 60 operable to detect an intake air quantity Q of the engine 30; an intake-air temperature sensor 62 operable to detect a temperature $T_A$ of the intake air; a throttle valve sensor 64 equipped with an engine idling switch, which is operable to detect an opening angle $\theta_{TH}$ of an electronic throttle valve, and a fully closed state of the electronic throttle valve (idling state of the engine 30); a vehicle speed sensor 66 operable to detect a running speed V of the vehicle (corresponding to a rotating speed $N_{OUT}$ of the output shaft 24); an engine-water temperature sensor 68 operable to detect a temperature $T_W$ of cooling water of the engine 30; a brake switch 70 operable to detect an operation of a service brake system of the vehicle; a sift-lever position sensor 74 operable to detect a presently selected position $P_{SH}$ of a manually operable member in the form of a shift lever 72; a turbine speed sensor 76 operable to detect a rotating speed Nt of the turbine impeller of the torque converter 32 (rotating speed $N_{IN}$ of the input shaft 22); an oil temperature sensor 78 operable to detect a temperature $T_{OIL}$ of the working fluid of a hydraulic control unit 98; and an accelerator sensor 80 operable to detect an acceleration value (deceleration value) G of the vehicle. The electronic control unit 90 receives output signals of those sensors and switches indicative of the engine speed $N_E$, intake-air quantity Q, intake-air temperature $T_A$, throttle opening angle $\theta_{TH}$, vehicle speed V, engine water temperature $T_W$, operation of the service brake system, shift lever position $P_{SH}$, turbine speed Nt, fluid temperature $T_{OIL}$, and vehicle acceleration (deceleration) value G.

Figure 5:
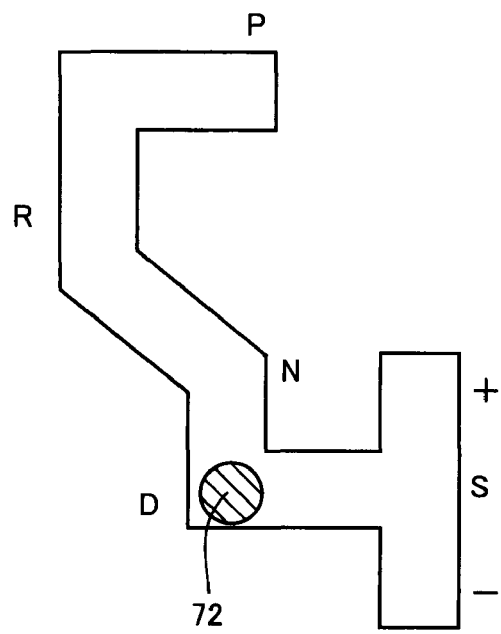
FIG. 5 is a view indicating operating positions of a shift lever shown in FIG. 4.

The shift lever 72 is disposed near a vehicle-operator's seat of the vehicle, and has five positions: a parking position P; a reverse position R; a neutral position N; a drive position D (automatic shifting position); and a sequential position S (manual shifting position), as shown in FIG. 5. The parking position P is selected to place the power transmitting path through the automatic transmission 10, in a power cut-off state, and to operate a mechanical parking mechanism for mechanically locking the output shaft 24. The reverse position R is selected to drive the vehicle in the backward or reverse direction, with the output shaft 24 rotated in the reverse direction. In the neutral position N, the power transmitting path through the automatic transmission 10 is placed in the power cut-off state. The drive position D is selected to drive the vehicle in the forward direction with an automatic shifting action of the automatic transmission 10 to one of the eight forward-drive gear positions. The sequential position S is selected to drive the vehicle in the forward direction such that the automatic transmission 10 may be shifted up or down by operating the shift lever 72 from the sequential position S to a shift-up position "+" or a shift-down position "−" indicated in FIG. 5. As indicated above, the shift-lever position sensor 74 detects the presently selected one of the positions P, R, N, D and S of the shift lever 72.

The hydraulic control unit 98 is provided with a manual valve connected to the shift lever 72 through a cable or any other linkage. When the shift lever 72 is operated, the manual valve is mechanically operated to switch the hydraulic circuit within the hydraulic control unit 98. When the shift lever 72 is placed in the drive position D or sequential position S, a forward drive pressure $P_D$ is generated to mechanically establish a forward-drive hydraulic circuit for permitting the vehicle in the forward direction with the automatic transmission 10 placed in a selected one of the forward-drive positions "1st" through "8th". When the shift lever 72 is operated to the drive position D, this position is detected by the shift-lever position sensor 74, and the electronic control device 90 establishes an automatic shifting mode of the automatic transmission 10 on the basis of the output signal of the shift-lever position sensor 74. In the automatic shifting mode, the automatic transmission 10 is permitted to be shifted to a selected one of the forward-drive positions "1st" through "8th"

Figure 6:
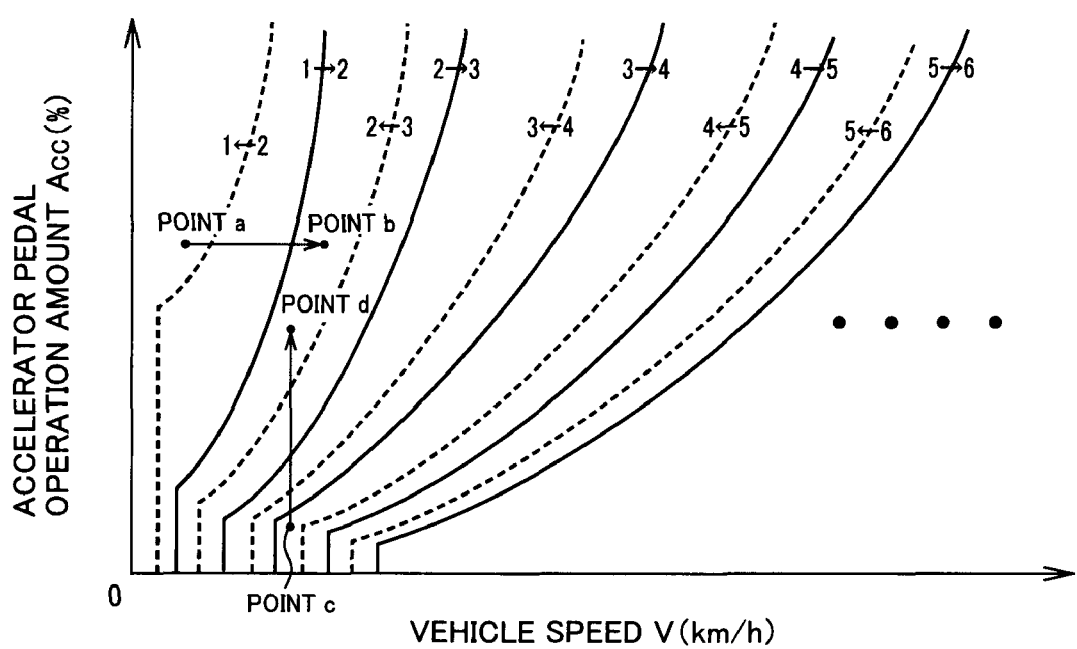
FIG. 6 is a view indicating an example of shifting boundary lines used by an electronic control device shown in FIG. 4, to control the automatic transmission.

The electronic control device 90 determines whether the automatic transmission 10 should be shifted from the presently established gear position. This determination is made on the basis of the detected vehicle speed V and operating amount $A_{CC}$ of the accelerator pedal 50, and according to a shifting boundary line map stored in a ROM, which represents a relationship between the vehicle speed V and the operating amount $A_{CC}$ of the accelerator pedal 50. An example of the shifting boundary line map is illustrated in FIG. 6. The shifting boundary line map is determined such that the automatic transmission 10 is shifted down to increase the speed ratio, as the detected vehicle speed V is lowered at a given value of the accelerator operating amount $A_{CC}$, or as the detected accelerator operating amount $A_{CC}$ is increased at a given value of the vehicle speed V, as is apparent from FIG. 6. According to the selected gear position to which the automatic transmission 10 should be shifted, appropriate ones of linear solenoid valves SL1-SL6 incorporated in the hydraulic control unit 98 are energized and de-energized to engage and release the appropriate ones of the clutches C and brakes B, for establishing the selected gear position, while electric currents to be applied to the appropriate linear solenoid valves SL1-SL6 are controlled to regulate the hydraulic pressures of the appropriate ones of the clutches C and brakes B in the process of the shifting action of the automatic transmission 10. Namely, the appropriate linear solenoid valves SL1-SL6 are energized and de-energized to engage and release the appropriate ones of the clutches C and brakes B for shifting the automatic transmission 10 to one of the forward-drive gear positions "1st" through "8th" on the basis of the actual vehicle speed V and operating amount $A_{CC}$ of the accelerator pedal 50 and according to the shifting boundary line map. It is noted that the vehicle speed V and operating amount $A_{CC}$ of the accelerator pedal 50 may be replaced by the throttle valve opening angle $\theta_{TH}$, intake air quantity Q and a gradient of a road surface on which the vehicle is running.

The shifting boundary line map of FIG. 6 represents shift-up boundary lines indicated by solid lines, and shift-down boundary lines indicated by broken lines. When the actual operating amount $A_{CC}$ (%) of the accelerator pedal 50 is held constant at a given value lying on a horizontal straight line, a determination as to whether the automatic transmission 10 should be shifted down or up is made by determining whether a point of the actual vehicle speed V is moved along the horizontal straight line, across any of the shift-down or shift-up boundary lines, each of which is a succession of critical shifting points Vs of the vehicle speed V above which the automatic transmission 10 should be shifted. In other words, those critical shifting points Vs corresponding to different values of the operating amount $A_{CC}$ of the accelerator pedal 50 are stored in the ROM. It is noted that the shift-up boundary lines and shift-down boundary lines of the shifting boundary line map shown in FIG. 6 correspond to the forward-drive gear positions "1st" through "6th" of the gear positions "1st" through "8th".

Figure 7:
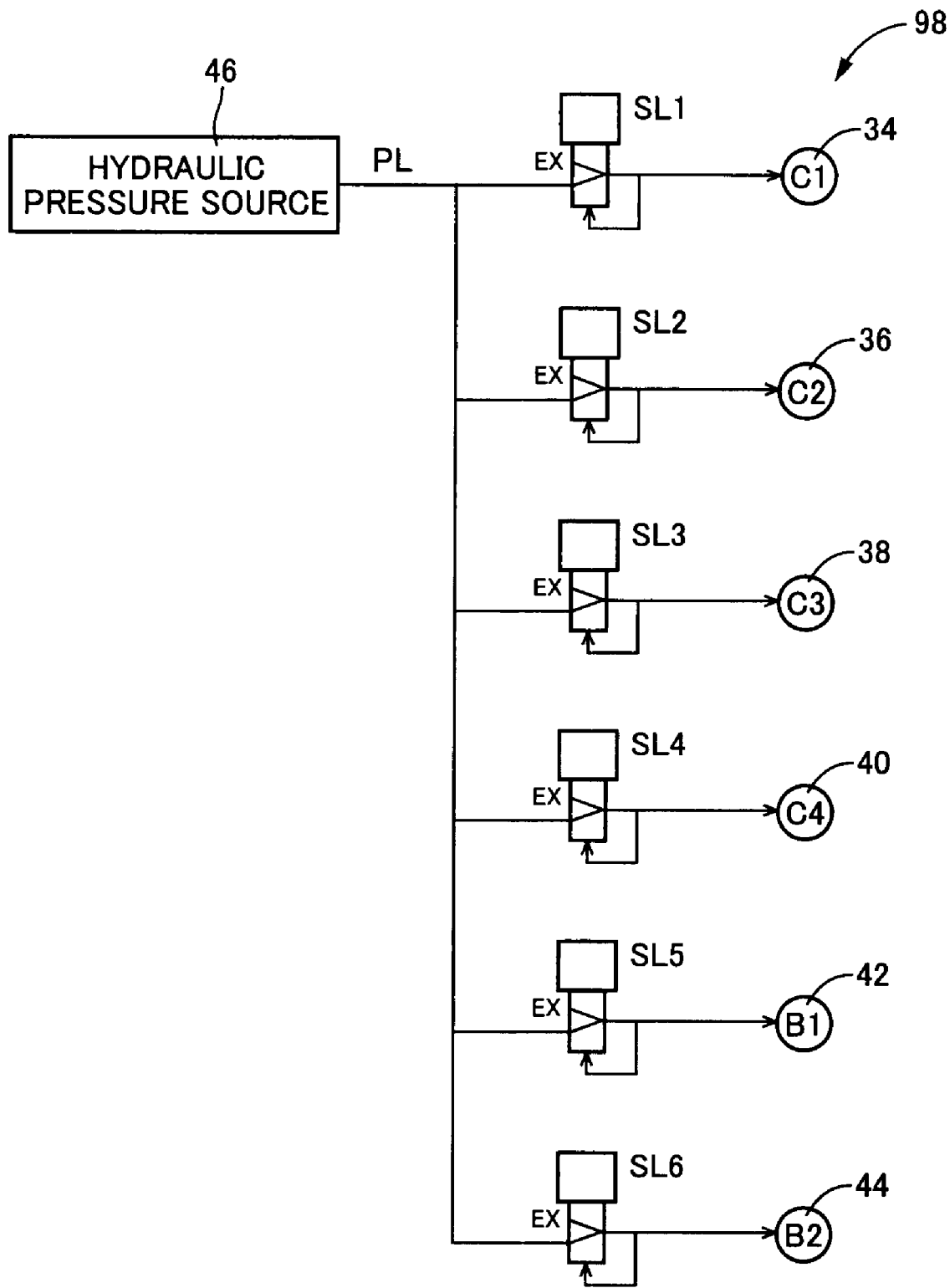
FIG. 7 is a view showing major portions of a hydraulic control unit shown in FIG. 4.

Referring back to the hydraulic circuit diagram of FIG. 7, there are shown the linear solenoid valves SL1-SL6 of the hydraulic control unit 98, and hydraulic actuators (hydraulic cylinders) 34, 36, 38, 40, 42 and 44 for the clutches C1-C4 and brakes B1, B2. The hydraulic actuators 34-44 are provided with hydraulic pressures which are adjusted by the respective linear solenoid valves SL1-SL6 based on a line pressure PL supplied from a hydraulic pressure source 46. The hydraulic pressure source 46 is provided with a mechanical oil pump 48 (shown in FIG. 1) driven by the engine 30, and a regulator valve operable to regulate the line pressure PL according to a load acting on the engine 30. The linear solenoid valves SL1-SL6 are basically identical in construction with each other, and are controlled (energized and de-energized) by the electronic control device 90 (shown in FIG. 4), independently of each other, to adjust the hydraulic pressures of the hydraulic actuators 34-44 independently of each other. When a so-called clutch-to-clutch shifting action of the automatic transmission 10 is performed, the appropriate two coupling elements selected from the clutches C and brakes B are concurrently engaged and released. When the shift-down action from the fifth gear position "5th" to the fourth gear position "4th" is performed, for example, the second clutch C2 is released while the fourth clutch C4 is released, as indicated in the table of FIG. 2. In this case, the transient hydraulic pressure of the second clutch C2 in the process of its releasing action and the transient hydraulic pressure of the fourth clutch C4 in the process of its engaging action are adequately controlled so as to reduce a shifting shock of the automatic transmission 10.

The clutch-to-clutch shifting action of the automatic transmission 10 to change the first gear position G1 established prior to the shifting action to the second gear position G2 is performed by releasing the first coupling element $C_{G1}$ which has been engaged to establish the first gear position G1 while at the same time engaging the second coupling element $C_{G2}$ to newly establish the second gear position G2. In the shift-up action from the first gear position "1st" to the second gear position "2nd", for example, the one-way clutch F1 corresponds to the first coupling element $C_{G1}$, while the first brake B1 correspond to the second coupling element $C_{G2}$. In the first gear position "1st", the first clutch C1 and the one-way clutch F1 are placed in the engaged state. In the second gear position "2nd", the first clutch C1 and the first brake B1 are placed in the engaged state. In the clutch-to-clutch shifting action controlled according to the prior art, the coupling elements which are other than the first and second coupling elements $C_{G1}$, $C_{G2}$ and which do not involve the clutch-to-clutch shifting action are held in the released state from the moments of initiation and termination of the shifting action. In the clutch-to-clutch shifting action controlled according to the present embodiment, however, one of the coupling elements other than the first and second coupling elements $C_{G1}$, $C_{G2}$ is temporarily brought into a partially engaging state or a slipping state in the process of the shifting action, for the purpose of reducing the required shifting time of the automatic transmission 10, namely, a time from the moment of initiation of the shifting action to the moment of termination of the shifting action. This aspect of controlling the clutch-to-clutch shifting action.

Figure 8:
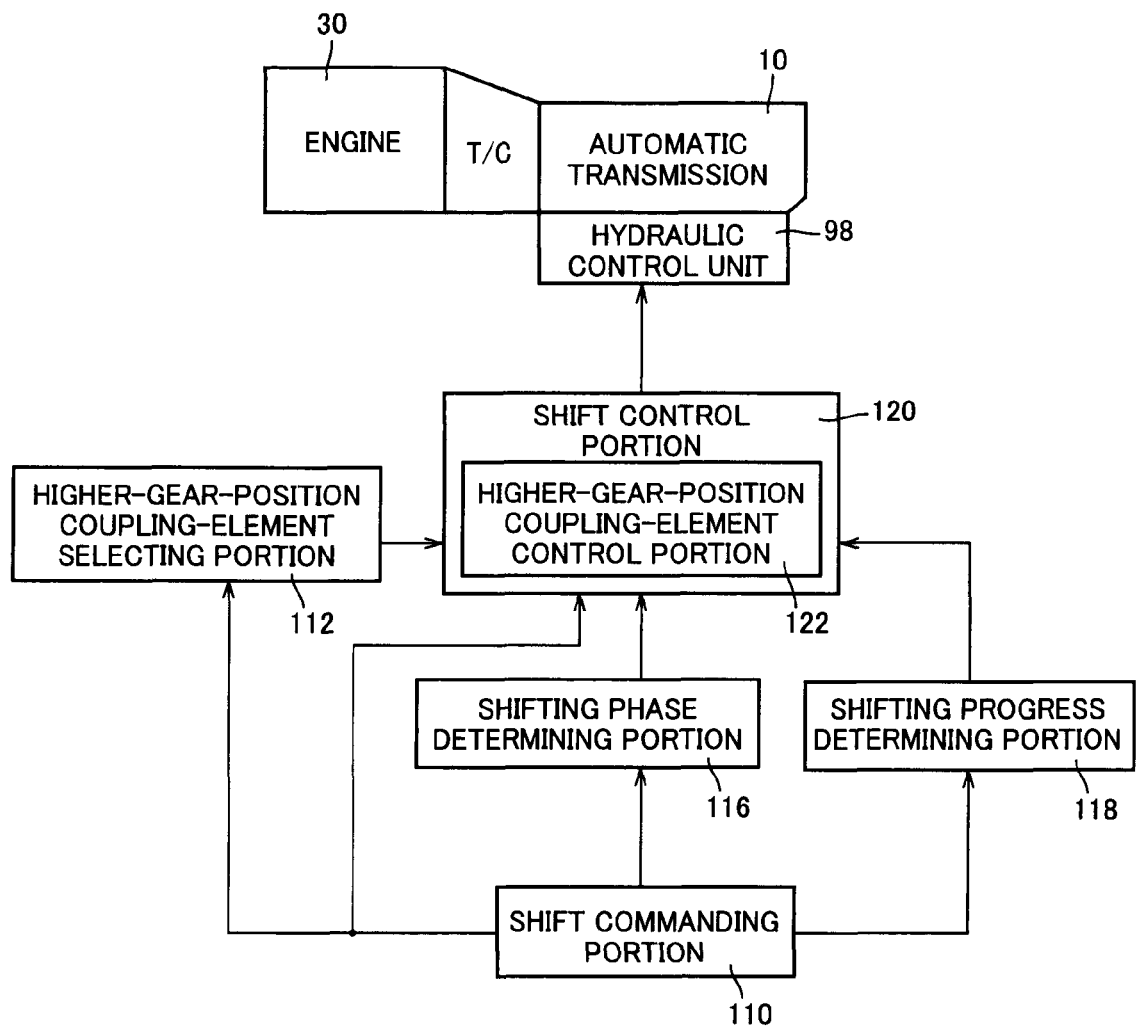
FIG. 8 is a functional block diagram illustrating major functional portions of the electronic control device of FIG. 4 according to a first embodiment of this invention.

Referring to the functional block diagram of FIG. 8, there will be described major control functions of the electronic control device 90. The electronic control device 90 includes a shift commanding portion 110, a higher-gear-position coupling-element selecting portion 112, a shifting phase determining portion 116, a shifting progress determining portion 118, and a shift control portion 120. The shift commanding portion 110 is configured to make the determination as to whether a shifting action of the automatic transmission 10 should be performed, on the basis of the actual vehicle speed V and operating amount $A_{CC}$ of the accelerator pedal, 50 and according to the stored shifting boundary line map indicated in FIG. 6 by way of example, and to generate a shifting command to perform the shifting action when the affirmative determination is obtained. When the vehicle speed V rises from a point "a" to a point "b" indicated in FIG. 6, and exceeds a shifting point $V_{1-2}$ for shifting up the automatic transmission 10 from the first gear position "1st" to the second gear position "2nd" while the first gear position $C_{G1}$ prior to the shifting action is the first gear position "1st", the shift commanding portion 110 generates a shifting command to perform the shift-up action of the automatic transmission 10 from the first gear position "1st" to the second gear position "2nd". When the shifting phase determining portion 116 which will be described determines that the shifting action initiated according to the shifting command is completed or has been terminated, the shift commanding portion 110 terminates the generation of the shifting command.

The higher-gear-position coupling element selecting portion 112 is configured to select at least one higher-gear-position coupling element, each of which is the coupling element to be engaged to establish a higher gear position of the automatic transmission 10. The higher-gear-position coupling element is placed in the released state prior and subsequent to the shift-up action performed according to the shifting command generated by the shift commanding portion 110, and is the higher gear position than the second gear position G2 to be established by the shift-up action. It will be understood that each higher-gear-position coupling element is a specially controlled coupling element which is included in the plurality of coupling elements (C, B, F) provided to perform the shifting actions of the automatic transmission 10 and which is placed in the fully released state prior and subsequent to the shifting action performed according to the presently generated shifting command. In other words, the higher-gear-position coupling element is the coupling element which is other than the first and second coupling elements $C_{G1}$, $C_{G2}$ and which is engaged to establish the gear position higher than the first and second gear positions G1, G2. When the shifting command to perform the shift-up action from the first gear position "1st" to the second gear position "2nd" is generated by the shift commanding portion 110, for example, the higher-gear-position coupling-element selecting portion 112 selects at least one of the higher-gear-position coupling elements in the form of the second clutch C2, third clutch C3 and fourth clutch C4, for example, selects only the fourth clutch C4 as the higher-gear-position coupling element, for reducing a control load of a higher-gear-position coupling-element control portion 122 of the shift control portion 120 which will be described.

The shifting phase determining portion 116 is configured to determine a present phase of the shifting action of the automatic transmission 10 initiated according to the shifting command, for instance, a torque phase or an inertia phase of the shifting action. Namely the shifting phase determining portion 116 determines whether the shifting action has entered the torque phase or inertia phase, for example.

The shifting phase determining portion 116 determines the present phase of the shifting action, in the manner well known in the prior art in connection with the clutch-to-clutch shifting action. Described in detail, the shifting phase determining portion 116 determines whether the shifting action initiated according to the shifting command generated by the shift commanding portion 110 has progressed into the torque phase or inertia phase, namely, has entered or initiated the torque phase or inertia phase. More specifically described, the shifting phase determining portion 116 determines that the shifting action has entered the torque phase, when a measured time which has passed after the moment of generation of the shifting command has exceeded a predetermined threshold time length corresponding to the moment of initiation or entry of the torque phase, and determines that the shifting action is prior to the torque phase when the measured time has not exceeded the predetermined threshold time length. The threshold time length is a time length from the moment of initiation of generation of the shifting command to the moment at which a mechanical clearance within the coupling element to be engaged to establish the second gear position G2 has been removed by application of a low standby pressure to the coupling element for improving the response of the engaging action, to an extent that does not establish the nominal torque capacity of the coupling element. This threshold time length, which is obtained by experimentation, is well known in the prior art in connection with the clutch-to-clutch shifting action. The nominal torque capacity described above is the maximum torque that can be transmitted by or through the coupling element, and corresponds to the commanded control pressure to be applied to the coupling element, that is, increases with an increase of the commanded control pressure.

The shifting phase determining portion 116 is further configured to make the determination as to whether the torque phase which has been initiated has been terminated, that is, whether the shifting action has entered or initiated the inertia phase. Described in detail, the shifting phase determining portion 116 determines whether the turbine speed Nt (rotating speed of the turbine impeller of the torque converter 32=rotating speed $N_{IN}$ of the input shaft 22) detected by the turbine speed sensor 76 has changed due to the shifting action of the automatic transmission 10. When it is determined that the turbine speed Nt has changed, the shifting phase determining portion 116 determines that the torque phase of the shifting action has been terminated and the inertial phase has been initiated.

The shifting phase determining portion 116 is further configured to make the determination as to whether the inertia phase which has been initiated has been terminated. Described in detail, the shifting phase determining portion 116 determines whether the change of the turbine speed Nt due to the shifting action of the automatic transmission 10 has been terminated, namely, whether the input shaft 22 is rotated in synchronization with the rotary motion of the output shaft 24, and the speed of the input shaft 22 is influenced by the vehicle speed V. The shifting phase determining portion 116 determines that the inertial phase has been terminated when it is determined that the change of he turbine speed Nt has been terminated. Upon the moment of determination of the termination of the inertial phase, or at a moment a short time thereafter required to confirm the synchronous rotary motions of the input and output shafts 22, 24, the shifting phase determining portion 116 determines that the shifting action of the automatic transmission 10 has been terminated with the synchronous rotary motions of the input and output shafts 22, 24.

The shifting progress determining portion 118 is configured to determine whether a degree of progress PG of the shifting action of the automatic transmission 10 has reached a predetermined target degree PG1 (hereinafter referred to as "target shifting progress degree PG1"), that is, the degree of progress PG is higher than the target shifting progress degree PG1. The degree of progress PG may be represented by a ratio of a time which has passed from the moment of initiation of the shifting action, to the entire time of the shifting action, or a ratio of the amount of change of the turbine speed Nt from the moment of initiation of the shifting action to the present time, to the entire amount of change of the turbine speed Nt from the moment of initiation to the moment of termination of the shifting action. The shifting progress determining portion 118 is configured to determine whether the turbine speed Nt has reached a threshold value N1t, and determines that the degree of progress PG of the shifting action has reached the target shifting progress degree PG1 when the turbine speed Nt has reached the threshold value N1t or is higher than the threshold value N1t. In the present embodiment wherein the target shifting progress degree PG1 is determined such that the degree of progress PG of the shifting action reaches the target shifting progress degree PG1 at the moment of termination of the inertial phase of the shifting action, the threshold value N1t of the turbine speed Nt is determined on the basis of the turbine speed Nt at the moment of termination of the shifting action, preferably, at the moment of initiation of the inertia phase, and the turbine speed Nt at the moment of termination of the shifting action, preferably, at the moment of termination of the inertia phase, which turbine speed is determined by the vehicle speed V and the second gear position G2. Where the threshold value N1t is determined such that the shifting progress determining portion 118 obtains the affirmative determination when 40% of the inertia phase of a shift-up action of the automatic transmission 10 is completed, for example, the threshold value N1t is determined to be Nts−(Nts−Nte)×0.4, wherein "Nts" represents the turbine speed at the moment of initiation of the inertial phase, while "Nte" represents the turbine speed Nt at the moment of termination of the inertial phase. The shifting progress determining portion 118 determines whether the turbine speed Nt has been lowered below the threshold value N1t in the shift-up action, and determines that the degree of progress PG of the shift-up action has reached or is higher than the target shifting progress degree PG1 when the turbine speed has been lowered below the threshold value N1t. The target shifting progress degree PG1 is determined by experimentation such that the degree of progress PG has reached the target shifting progress degree PG1 when a change of the torque of the output shaft 24 appearing as a shifting shock upon initiation of the inertia phase, more precisely, immediately after the moment of initiation of the inertia phase is terminated.

The shifting control portion 120 is configured to control the hydraulic control unit 98 according to the shifting command generated by the shift commanding portion 110 to perform the clutch-to-clutch shift-up action, for controlling the shift-up action from the first gear position G1 to the second gear position G2 by releasing the first coupling element $C_{G1}$ (releasing-side coupling element $C_{G1}$) while at the same time engaging the second coupling element $C_{G2}$ (engaging-side coupling element $C_{G2}$). The above-described higher-gear-position coupling-element control portion 122 of the shift control portion 120 is configured to control at least one of the higher-gear-position coupling elements selected by the higher-gear-position coupling-element selecting portion 112 such that each selected higher-gear-position coupling element is temporarily placed in a partially engaged or slipping state (not in the fully engaged state) during the shifting action (shift-up action) of the automatic transmission 10, to cause the higher-gear-position coupling element to have a torque capacity. The shift control portion 120 (higher-gear-position coupling-element control portion 122) controls the releasing action of the first coupling element $C_{G1}$, the engaging action of the second coupling element $C_{G2}$, and the slipping action of the higher-gear-position coupling element(s) in synchronization with each other, by changing the commanded control pressures (commanded amounts of electric current) of those coupling elements, as described below in detail.

When the shifting phase determining means 116 determines that the shift-up action has not entered the torque phase while the shifting command to perform the shift-up action of the automatic transmission 10 is generated by the shift commanding portion 110, the shift control portion 120 raises a commanded control pressure $P_{G2}$ (commanded engaging pressure $P_{G2}$) of the second coupling element $C_{G2}$ (engaging-side coupling element $C_{G2}$) to the predetermined low standby pressure for removing the mechanical clearance within the second coupling element $C_{G2}$ for improving the response of the engaging action, to an extent that does not establish the nominal torque capacity of the second coupling element $C_{G2}$. Similarly, the higher-gear-position coupling-element control portion 122 raises a commanded control pressure $P_{GH}$ (commanded engaging pressure $P_{GH}$) of the higher-gear-position coupling element to the low standby pressure when the shifting phase determining portion 116 determines that the shift-up action has not entered the torque phase while the shifting command to perform the shift-up action is generated by the shift commanding portion 110. The shift control portion 120 and its higher-gear-position coupling-element control portion 122 initially implements fast or quick rises of the commanded control pressures of the second coupling element $C_{G2}$ and the higher-gear-position coupling element, to a value higher than the predetermined low standby pressure, before the commanded control pressures are held at the low standby pressures.

During the torque phase the initiation and termination of which are detected by the shifting phase determining portion 116, the shift control portion 120 raises the commanded control pressure $P_{G2}$ of the second coupling element $C_{G2}$ from the low standby pressure at a predetermined rate to increase the torque capacity, as in the clutch-to-clutch shifting controlled according to the prior art. However, the higher-gear-position coupling-element control portion 122 holds the commanded control pressure $P_{GH}$ of the higher-gear-position coupling element at the predetermined low standby pressure, during the entire period of the torque phase.

When the shifting phase determining portion 116 then determines that the shift-up action has entered or initiated the inertia phase, the shift control portion 120 further raises the commanded control pressure $P_{G2}$ of the second coupling element $C_{G2}$ (which has been raised in the torque phase) at a predetermined first rate $\Delta P1_{UP}$, and the higher-gear-position coupling-element control portion 122 raises the commanded control pressure $P_{GH}$ of the higher-gear-position coupling element from the low standby pressure at a predetermined rise rate $\Delta P1_H$, to increase the torque capacity of the higher-gear-position coupling element. That is, the higher-gear-position coupling-element control portion 122 raises the commanded control pressure $P_{GH}$ at the moment of initiation of the inertia phase of the shift-up action of the automatic transmission 10, for enabling the higher-gear-position coupling element to have a torque capacity.

When the shifting progress determining portion 118 then determines that the degree of progress PG of the shift-up action has reached the target shifting progress degree PG1 after the initiation of the inertia phase, the shift control portion 120 raises the commanded control pressure $P_{G2}$ of the second coupling element $C_{G2}$ at a predetermined second rate $\Delta P2_{UP}$, and the higher-gear-position coupling-element control portion 122 terminates the rise of the commanded control pressure $P_{GH}$ of the higher-gear-position coupling element at the rise rate $\Delta P1_H$, and lowers the commanded control pressure $P_{GH}$ at a predetermined fall rate $\Delta P2_H$, to reduce the torque capacity of the higher-gear-position coupling element.

When the shifting phase determining portion 116 then determines that the inertia phase of the shift-up action has been terminated, the shift control portion 120 terminates the rise of the commanded control pressure $P_{G2}$ of the second coupling element $C_{G2}$ at the second rate $\Delta P2_{UP}$, and holds the commanded control pressure $P_{G2}$ at the present value, and the higher-gear-position coupling-element control portion 122 terminates the fall of the commanded control pressure $P_{GH}$ at the fall rate $\Delta P2_H$, and holds the commanded control pressure $P_{GH}$ at the present value or a value lower than the low standby pressure.

When the shifting phase determining portion 116 then determines that the input shaft 22 and the output shaft 24 initiate the synchronous rotary motions, the shift control portion 120 rapidly raises the commanded control pressure $P_{G2}$ of the second coupling element $C_{G2}$ to a predetermined shifting-termination pressure, which is the engaging pressure of the second coupling element $C_{G2}$ placed in the fully engaged state, and the higher-gear-position coupling-element control portion 122 rapidly lowers the commanded control pressure $P_{GH}$ of the higher-gear-position coupling element to zero, for fully releasing the higher-gear-position coupling element.

Target values of a rate of change of the torque $T_{OUT}$ of the output shaft 24 (hereinafter referred to as "output shaft torque $T_{OUT}$") and target values of a rate of change of the turbine speed Nt (an amount of change $\Delta$Nt of the turbine speed Nt per unit time, which is hereinafter referred to as "turbine speed change rate $\Delta$Nt") during the shifting actions (shift-up actions) of the automatic transmission 10 are determined by experimentation, for the respective shifting actions, so as to reduce the required shifting times while reducing the shifting shocks, for improving the driving comfort of the vehicle. The above-described first rate $\Delta P1_{UP}$, second rate $\Delta P2_{UP}$, rise rate $\Delta P1_H$ and drop rate $\Delta P2_H$, which are parameters to control the commanded control pressure $P_{G2}$ of the second coupling element $C_{G2}$ and the commanded control pressure $P_{GH}$ of the higher-gear-position coupling element, are determined according to motion equations of the rotary elements of the automatic transmission 10, so as to establish the target values of the rate of change of the output shaft torque $T_{OUT}$ and the target values of the rate of change of the turbine speed Nt. In particular, the rise rate $\Delta P1_H$ and drop rate $\Delta P2_H$ for the higher-gear-position coupling element are determined to enable this coupling element to have a torque capacity by placing the coupling element in the slipping sate (non-fully-engaged state). Accordingly, the shift control portion 120 and the higher-gear-position coupling-element control portion 122 respectively control the commanded control pressure $P_{G2}$ of the second coupling element $C_{G2}$ and the commanded control pressure $P_{GH}$ of the higher-gear-position coupling element, that is, the torque capacities of the second coupling element $C_{G2}$ and the higher-gear-position coupling element, in a predetermined relationship with each other, so as to obtain the target values of the rate of change of the torque shaft torque $T_{OUT}$ and the target values of the rate of change of the turbine speed Nt during the inertia phase of the shift-up actions. IN the case of the shift-up action from the first gear position "1st'" to the second gear position "2nd", for example, the shift control portion 120 and the higher-gear-position coupling-element control portion 122 control a commanded control pressure $P_{B1}$ of the first brake B1 serving as the second coupling element $C_{G2}$ and a commanded control pressure $P_{C4}$ of the fourth clutch C4 serving as the higher-gear-position coupling element, so that the output shaft torque $T_{OUT}$ represented by the following equation and the turbine speed change rate $\Delta Nt$ represented by the following equation are controlled to the above-indicated target values.

$$T_{OUT}=(0.0688)\times Tt+(3.1493)\times Tb1+(3.0805)\times Tcd \quad (1)$$

$$\Delta Nt=(6.3685)\times Tt(-7.6334)\times Tb1\times(-014.0019)\times Tcd \quad (2)$$

In the above-indicated equations (1) and (2), "Tt", "Tb1" and "Tc4" respectively represent the turbine torque, namely, the torque of the input shaft 22, the torque transmitted through the first brake B1, and the torque transmitted through the fourth clutch C4. The equations (1) and (2) are derived from the motion equations of the rotary elements of the automatic transmission 10 during the shift-up action from the first gear position "1st'" to the second gear position "2nd". In the equation (2), the coefficients for the torques "Tb1" and "Tc4" are negative values, the turbine speed change rate $\Delta Nt$ increases in the negative direction with an increase of the torque Tb1 transmitted through the first brake B1 and an increase of the torque Tc4 transmitted through the fourth clutch C4. Namely, the rate of reduction of the turbine speed Nt increases, and the time between the moments of initiation and termination of the inertia phase of the above-indicated shift-up action decreases as the torques Tb1, Tc4 increase.

When the shifting command to perform the clutch-to-clutch shift-up action is generated by the shift commanding portion 110, the shift control portion 120 controls this shift-up action such that the releasing action of the first coupling element $C_{G1}$ and the engaging action of the second coupling element $C_{G2}$ are initiated, and concurrently placed in the slipping states before the first and second coupling elements $C_{G1}$, $C_{G2}$ are eventually brought into the fully released and engaged states, respectively, as in the clutch-to-clutch shifting action controlled according to the prior art. Where the first coupling element $C_{G1}$ is the one-way clutch F1, however, the hydraulic pressure of the this first coupling element is not controlled to perform the shift-up action from the first gear position "1st" to the second gear position "2nd", for example, and the shift control portion 120 does not control the releasing action of the one-way clutch F1.

Figure 9:
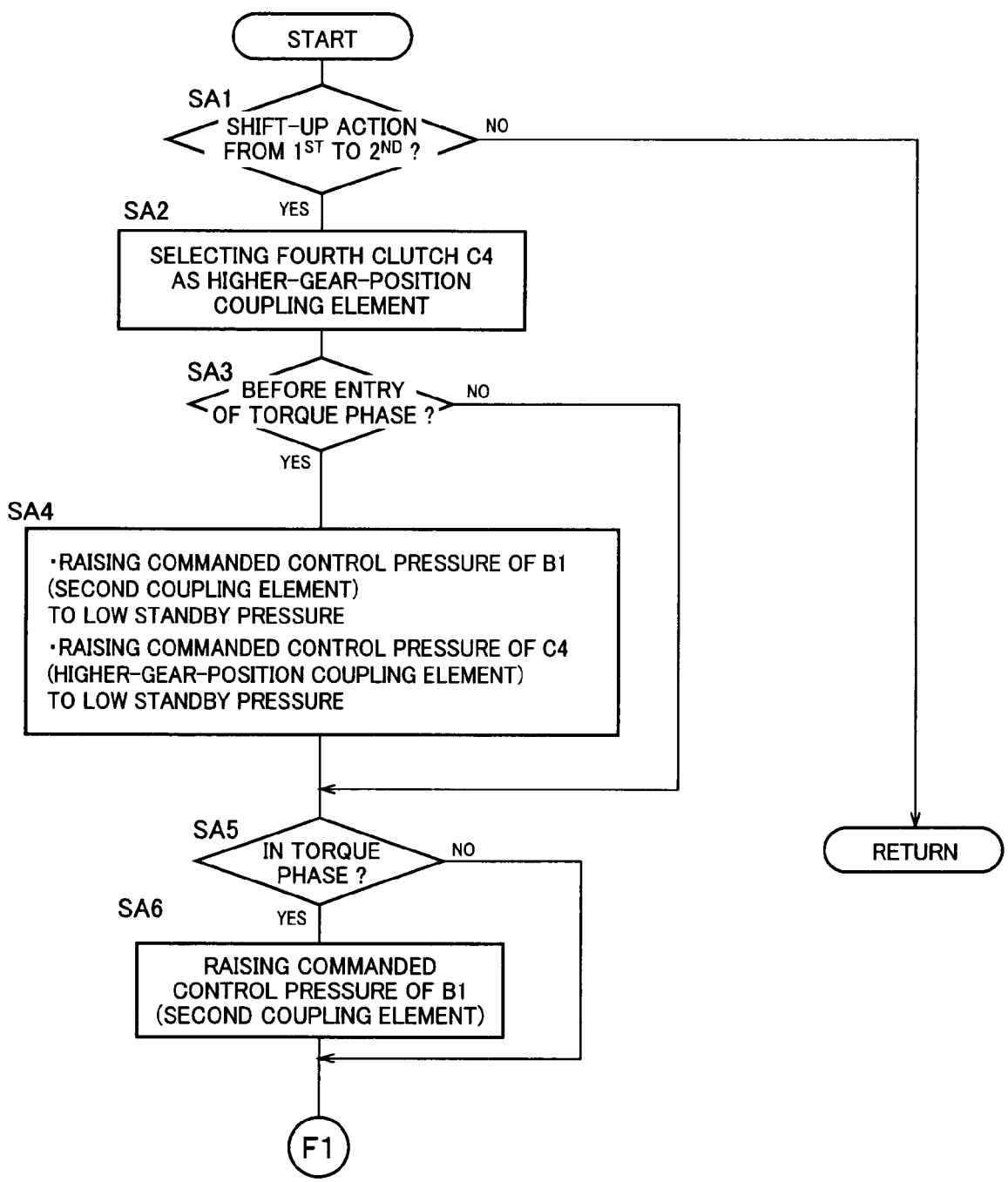
FIG. 9 is a flow chart illustrating a part of a control routine executed by the electronic control device of FIG. 4 according to the first embodiment when a shift-up action of the automatic transmission from a first gear position to a second gear position is performed with an engaging action of a coupling element in the form of a first brake.
Figure 10:
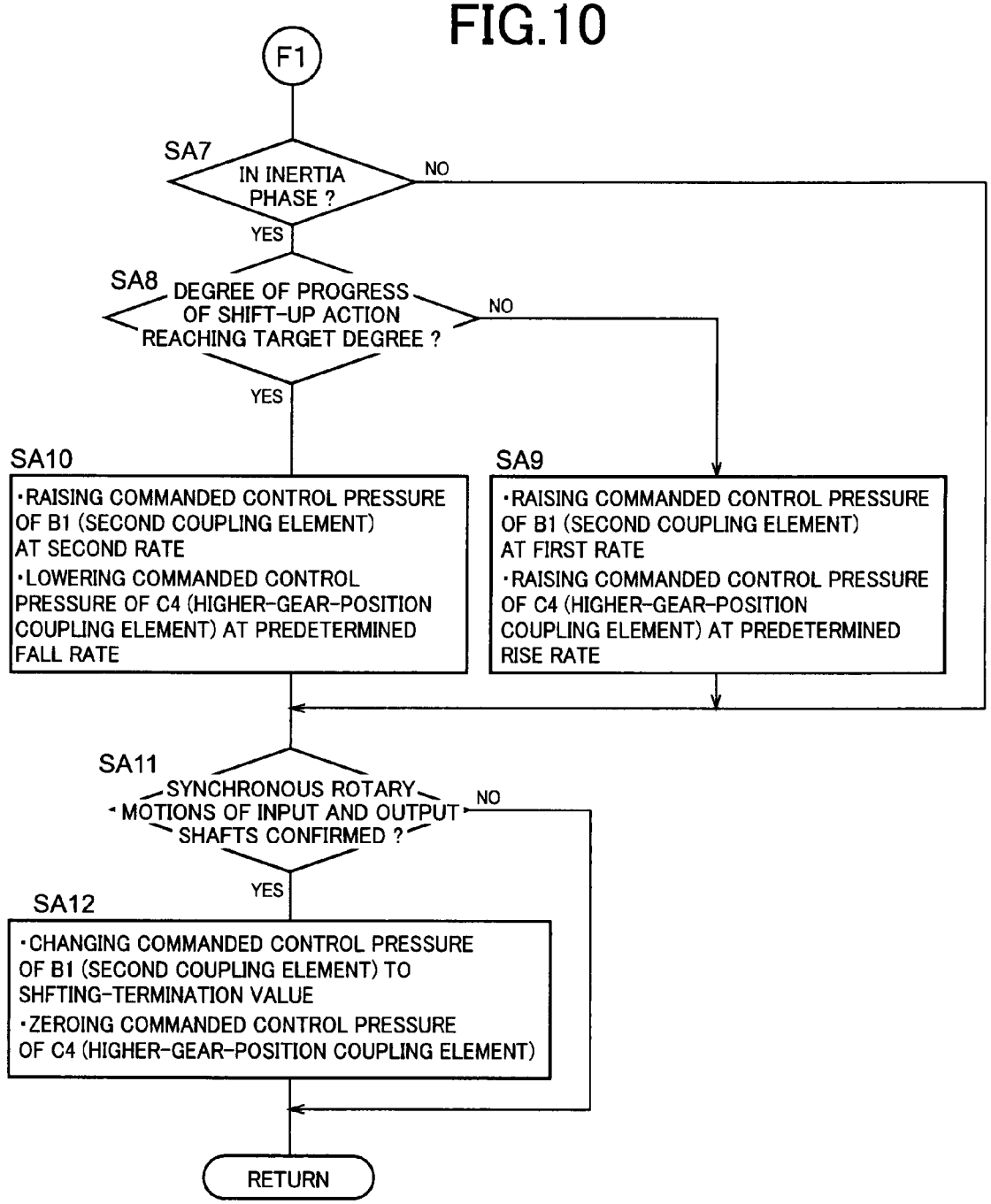
FIG. 10 is a flow chart illustrating the remaining part of the above-described control routine.

Referring to the flow charts of FIGS. 9 and 10, there is illustrated a major control operation of the electronic control device 90, that is, a control routine to control the shift-up action of the automatic transmission 10 from the first gear position "1st" to the second gear position "2nd", more specifically, to control the engaging action of the second coupling element $C_{G2}$ in the form of the first brake B1 and the temporary slipping action of the higher-gear-position coupling element in the form of the fourth clutch C4, by way of example. This control routine is repeatedly executed with an extremely short cycle time of about several milliseconds to about several tens of milliseconds.

The control routine is initiated with step SA1 corresponding to the shift commanding portion 110, to make the determination as to whether the shift-up action of the automatic transmission 10 from the first gear position "1st" to the second gear position "2nd" should take place, on the basis of the actual vehicle speed V and operating amount $A_{CC}$ of the accelerator pedal 50 and according to the shifting boundary line map of FIG. 6. When the affirmative determination is obtained in step SA1, that is, when it is determined that the shift-up action from the first gear position "1st" to the second gear position "2nd" should take place, the control flow goes to step SA2. If the negative determination is obtained in step SA1, one cycle of execution of the control routine is terminated.

In the step SA2 corresponding to the higher-gear-position coupling-element selecting portion 112, to select the fourth clutch C4 as the higher-gear-position coupling element. The fourth clutch C4 is engaged to establish the fourth and sixth gear positions "4th" and "6th", which are higher-gear-positions than the first and second gear positions G1, G2 in the form of the first and second gear positions "1st" and "2nd".

The step SA2 is followed by step SA3 corresponding to the shifting phase determining portion 116, to determine whether the shift-up action of the automatic transmission 10 from the first gear position "1st" to the second gear position "2nd" is prior to the entry or initiation of the torque phase. Described more specifically, the length of time which has passed after the moment of generation of the shifting command to perform the shift-up action is measured. When the measured length of time is shorter than the above-described predetermined threshold time length corresponding to the moment of initiation or entry of the torque phase, the affirmative determination is obtained in the step SA3, that is, it is determined that the shift-up action in question is prior to the initiation of the torque phase. In this case, the control flow goes to step SA4. If the negative determination is obtained in the step SA3, the control flow goes to step SA5 while skipping the step SA4.

In the step SA4 corresponding to the shift control portion 120 and its higher-gear-position coupling-element control portion 122, the commanded control pressure $P_{B1}$ of the first brake B1 (second coupling element $C_{G2}$) is raised to the predetermined low standby pressure described above. Concurrently, the commanded control pressure $P_{PC4}$ of the fourth clutch C4 (higher-gear-position coupling element) is raised to the predetermined low standby pressure described above. In the initial period of rising of the commanded control pressures of the first brake B1 and fourth clutch C4 to the low standby pressure, these commanded control pressures are quickly raised for fast temporary partial engagement of the first brake B1 and fourth clutch C4 before the commanded control pressures are held at the low standby pressures.

In the following step SA5 also corresponding to the shifting phase determining portion 116, the determination as to whether the shift-up action from the first gear position "1st" to the second gear position "$2^{nd}$" is in the torque phase is made. When the measured time which has passed after the moment of generation of the shifting command to perform the shift-up action from the first gear position "1st" to the second gear position "$2^{nd}$" has exceeded the predetermined threshold time length, it is determined that the torque phase of the shift-up action in question has been initiated. When a fall or drop of the turbine speed Nt due to the shift-up action has been initiated, it is determined that the torque phase has been terminated. When the shift-up action in question is in the torque phase, that is, when the affirmative determination is obtained in the step SA5, the control flow goes to step SA6. When the negative determination is obtained in the step SA5, the control flow goes to step SA7 (FIG. 10).

In the step SA6 corresponding to the shift control portion 120, the commanded control pressure $P_{B1}$ of the first brake B1 (second coupling element $C_{G2}$) is raised at the predetermined rate to increase the torque capacity of the first brake B1, as in the clutch-to-clutch shifting action controlled according to the prior art. During the torque phase, the commanded control pressure $P_{C4}$ of the fourth clutch C4 (higher-gear-position coupling element) remains at the predetermined low standby pressure.

In the step SA7 also corresponding to the shifting phase determining portion 116, the determination as to whether the shift-up action in question is in the inertia phase. When it is determined that the torque phase has been terminated, it is determined that the inertia phase has been initiated. When it is determined that the drop of the turbine speed Nt due to the shift-up action has been terminated, it is determined that the inertia phase has been terminated. When the shift-up action in question is in the inertia phase, that is, when the affirmative determination is obtained in the step SA7, the control flow goes to step SA8. When the negative determination is obtained in the step SA7, the control flow goes to step SA11 while skipping steps SA8-SA10.

In the step SA8 corresponding to the shifting progress determining portion 118, the determination as to whether the degree of progress PG of the shift-up action of the automatic transmission 10 has reached the predetermined target shifting progress degree PG1. When the turbine speed Nt which falls as the inertial phase of the shift-up action in question progresses is lower than the threshold value N1t corresponding to the target shifting progress degree PG1, it is determined that the degree of progress PG has reached the target shifting progress degree PG1. When the degree of progress PG of the shift-up action of the automatic transmission portion 10 has reached the target shifting progress degree PG1, that is, when the affirmative determination is obtained in the step SA8, the control flow goes to step SA10. When the negative determination is obtained in the step SA8, the control flow goes to step SA9.

In the step SA9 corresponding to the shift control portion 120 and the higher-gear-position coupling-element control portion 122, the commanded control pressure $P_{B1}$ of the first brake B1 (second coupling element $C_{G2}$) is raised at the above-described predetermined first rate $\Delta P1_{UP}$. Concurrently, preferably, in synchronization with the rise of the commanded control pressure $P_{B1}$, the commanded control pressure $P_{C4}$ of the fourth clutch C4 (higher-gear-position coupling element) is raised at the above-described predetermined rise rate $\Delta P1_H$. The step SA9 is followed by step SA11.

In the step SA10 also corresponding to the shift control portion 120 and the higher-gear-position coupling-element control portion 122, the commanded control pressure $P_{B1}$ of the first brake B1 (second coupling element $C_{G2}$) is raised at the above-described predetermined second rate $\Delta P2_{UP}$. Concurrently, preferably, in synchronization with the rise of the commanded control pressure $P_{B1}$, the commanded control pressure $P_{C4}$ of the fourth clutch C4 (higher-gear-position coupling element) is lowered at the above-described predetermined fall rate $\Delta P2_H$. The step SA10 is followed by step SA11. The above-described first rate $\Delta P1_{UP}$, second rate $\Delta P2_{UP}$, rise rate $\Delta P1_H$ and drop rate $\Delta P2_H$, which are used in the steps SA9 and SA10 are determined according to the above-described equations (1) and (2), so as to establish the predetermined target values of the rate of change of the torque shaft torque $T_{OUT}$ and the target values of the rate of change of the turbine speed Nt. Namely, the commanded control pressures $P_B1$, $P_{C4}$ of the first brake B1 and fourth clutch C4 are controlled in the steps SA9 and SA10 so as to establish the target values of the rate of change of the torque shaft torque $T_{OUT}$ and the target values of the rate of change of the turbine speed Nt, in the predetermined relationship with each other according to the above-described equations (1) and (2).

In the step SA11 also corresponding to the shifting phase determining portion 116, the determination is made to confirm the synchronous rotary motions of the input shaft 22 and the output shaft 24. Theoretically, the inertial phase of the shift-up action in question is terminated at the moment when the rotary motions of the input and output shafts 22, 24 have been confirmed. However, the electronic control device 90 requires a short time to confirm the synchronous rotary motions of the input and output shafts 22, 24, so that the synchronous rotary motions have been confirmed the short time after the moment of termination of the inertia phase. When the rotary motions have been confirmed, that is, when the affirmative determination is obtained in the step SA11, the control flow goes to step SA12. When the negative determination is obtained in the step SA11, one cycle of execution of the present control routine is terminated.

In the step SA12 also corresponding to the shift control portion 120 and higher-gear-position coupling-element control portion 122, the commanded control pressure $P_{B1}$ of the first brake B1 (second coupling element $C_{G2}$) is immediately raised to the predetermined shifting-termination value, as in the clutch-to-clutch shifting action controlled according to the prior art. Concurrently, preferably, in synchronization with the rise of the commanded control pressure $P_{B1}$ to the shifting-termination value, the commanded control pressure $P_{C4}$ of the fourth clutch C4 (higher-gear-position coupling element) is immediately lowered to zero to bring the fourth clutch C4 into the fully released state. When the first brake B1 has been placed in the fully engaged state with the commanded control pressure $P_{B1}$ being raised to the shifting-termination value, while the fourth clutch C4 has been placed in the fully released state with the commanded control pressure $P_{C4}$ being zeroed, the shift-up action from the first gear position "1st" to the second gear position "2nd" is terminated or completed, and the shifting command is canceled.

In the case of the shift-up action from the first gear position "1st" to the second gear position "2nd", the one-way clutch F1 which is not a hydraulically operated coupling element is the first coupling element $C_{G1}$, the one-way clutch F1 is not hydraulically controlled to be brought into the fully released state.

Figure 11:
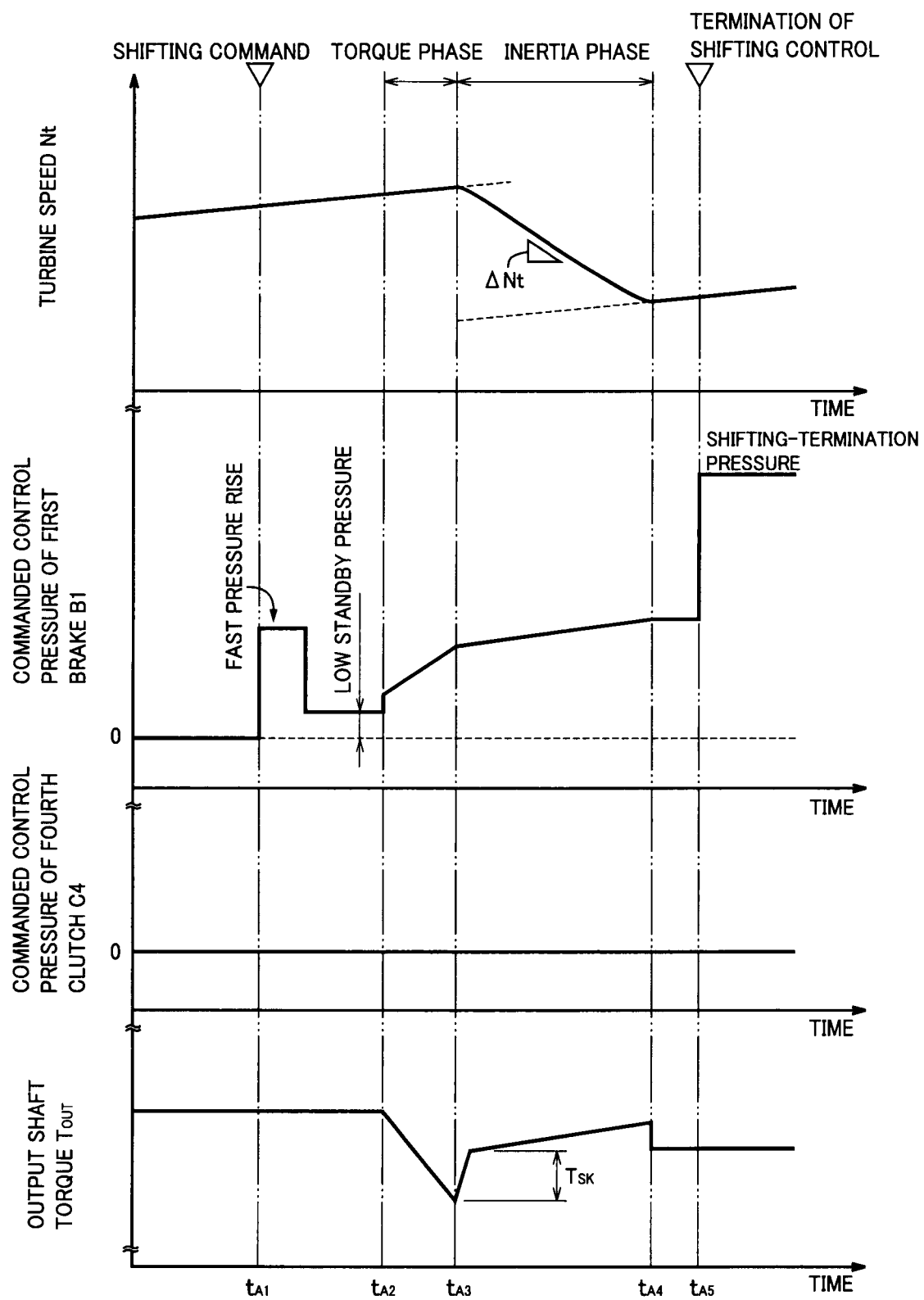
FIG. 11 is a time chart indicating the shift-up action from the first gear position to the second gear position, which is controlled by the prior art control apparatus, wherein a commanded control pressure of a fourth clutch is held zero.
Figure 12:
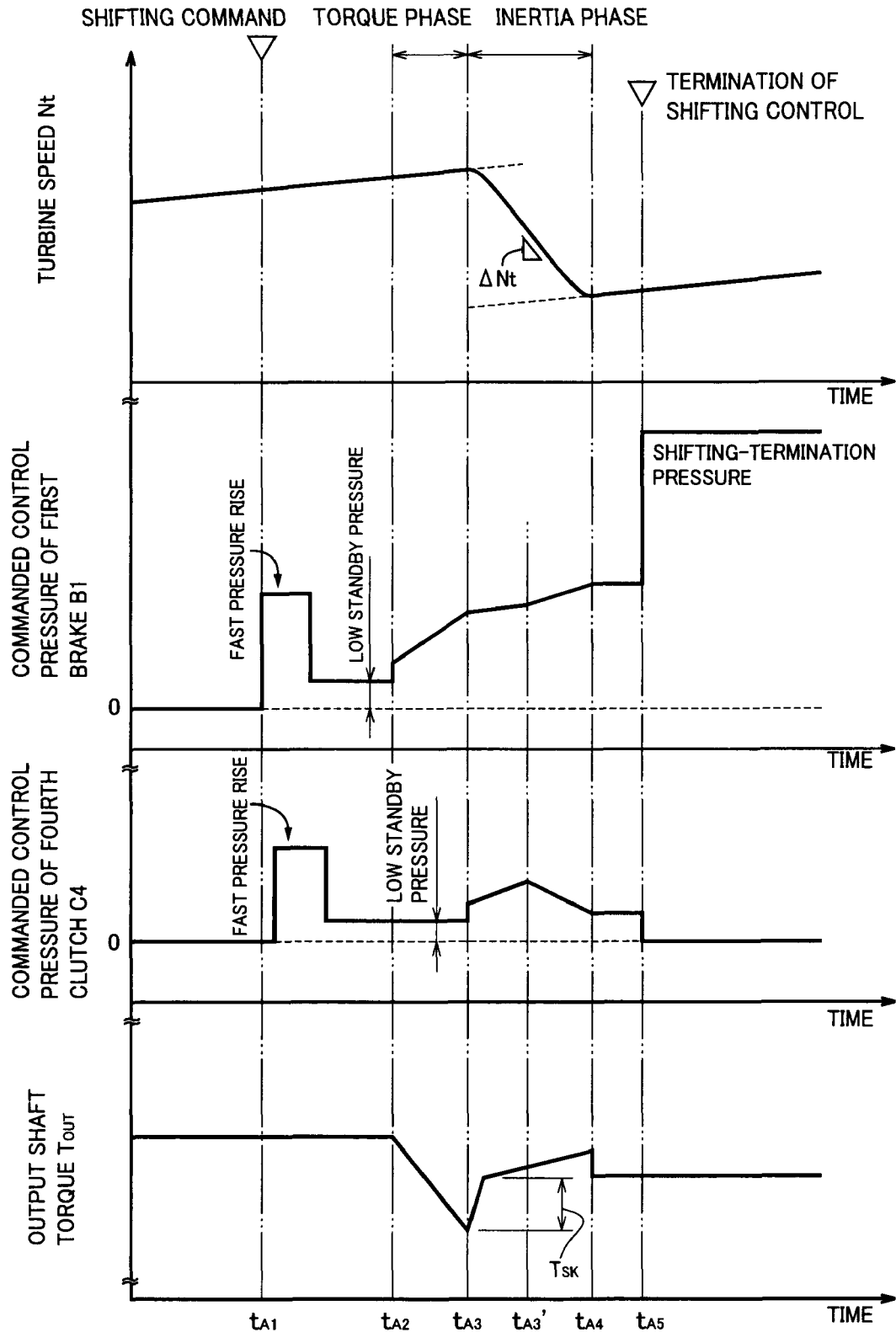
FIG. 12 is a time chart indicating the shift-up action controlled by the electronic control device according to the first embodiment of this invention, wherein the commanded control pressure of the fourth clutch (high-gear-position coupling element) is raised to place the fourth clutch in a slipping state during the shift-up action.

Referring next to the time charts of FIGS. 11 and 12, there will be described the shift-up action of the automatic transmission 10 controlled according to the present embodiment wherein the selected higher-gear-position coupling element is temporarily placed in the slipping state to enable this coupling element to have a torque capacity, in comparison with the same shift-up action controlled according to the prior art wherein the higher-gear-position coupling is not temporarily placed in the slipping state to enable the coupling element to have a torque capacity. The time chart of FIG. 11 shows the shift-up action from the first gear position "1st" to the second gear position "2nd" controlled according to the prior art wherein the fourth clutch C4 (higher-gear-position coupling element) is held in the fully released state with the commanded control pressure $P_{C4}$ being held at zero, while the time chart of FIG. 12 shows the same shift-up action controlled according to the present embodiment wherein the fourth clutch C4 (higher-gear-position coupling element) is temporarily placed in the slipping state with the commanded control pressure $P_{C4}$ being temporarily raised during the shift-up action. In these time charts, there are indicated the turbine speed Nt, commanded control pressure $P_{B1}$ of the first brake B1 (second coupling element $C_{G2}$), commanded control pressure $P_{C4}$ of the fourth clutch C4 (higher-gear-position coupling element) and output shaft torque $T_{OUT}$, in the order of description from the top toward the bottom.

At a point of time $t_{A1}$ in FIGS. 11 and 12, the shifting command to perform the shift-up action from the first gear position "1st" to the second gear position "2nd" is generated. In the shift-up action controlled according to the present embodiment illustrated in FIG. 12, the affirmative determination is obtained in the step SA1 of FIG. 9 when the shifting command is generated, so that the step SA4 is implemented to rapidly raise the commanded control pressure $P_{B1}$ of the first brake B1 at the point of time $t_{A1}$, for a temporary fast partial engagement of the first brake B1, and then raise the commanded control pressure $P_{B1}$ to the low standby pressure. A short time after the point of time $t_{A1}$, the commanded control pressure $P_{C4}$ of the fourth clutch C4 is rapidly raised for a temporary fast partial engagement of the fourth clutch C4, and is then raised to the low standby pressure. In the shift-up action controlled according to the prior art illustrated in FIG. 11, the commanded control pressure $P_{B1}$ of the first brake B1 is rapidly raised at the point of time $t_{A1}$, for the temporary fast partial engagement of the first brake B1, and is then raised to the low standby pressure, as in the present embodiment of FIG. 12. However, the commanded control pressure $P_{C4}$ of the fourth clutch C4 is held at zero. According to the present embodiment of FIG. 12, the rapid rise of the commanded control pressure $P_{C4}$ for the temporary fast partial engagement of the fourth clutch C4 is delayed a short time with respect to the point of time $t_{A1}$. This delay is not essential, that is, the rapid rise for the temporary fast partial engagement of the fourth clutch C4 may be initiated at the point of time $t_{A1}$.

At a point of time $t_{A2}$ in FIGS. 11 and 12, the predetermined threshold time length has passed after the point of time $t_{A1}$, and the affirmative determination is obtained in the step SA5 of FIG. 9 according to the present embodiment, so that the step SA6 is implemented to slightly raise the commanded control pressure $P_{B1}$ of the first brake B1 at the point of time $t_{A2}$ and then raise it at the predetermined rate. According to the prior art, too, the commanded control pressure $P_{B1}$ of the first brake B1 is lightly raised at the point of time $t_{A2}$ and is then raised at the predetermined rate, as in the present embodiment. As shown in FIGS. 11 and 12, the output shaft torque $T_{OUT}$ is reduced during a time period starting at the point of time $t_{A2}$, as the commanded control pressure $P_{B1}$ is raised. During the time period between the point of time $t_{A1}$ and the point of time $t_{A3}$ at which the inertia phase is initiated, the commanded control pressure $P_{B1}$ is controlled according to the present embodiment of FIG. 12 in the same manner as in the prior art of FIG. 11. Accordingly, the control pattern of the commanded control pressure $P_{B1}$ between the points of time $T_{A1}$, $T_{A3}$ according to the present embodiment of FIG. 12 is identical with that of the prior art of FIG. 11.

At the point of time $t_{A3}$ in FIGS. 11 and 12, the turbine speed Nt begins to fall, and the torque phase of the shift-up action is terminated, so that the affirmative determination is obtained in the step SA7 of FIG. 10 according to the present embodiment. Since the negative determination is obtained in the step SA8 at the point of time $t_{A3}$, the step SA9 is implemented according to the present embodiment. Accordingly, the rise of the commanded control pressure $P_{B1}$ at the predetermined first rate $\Delta P1_{UP}$ and the rise of the commanded control pressure $P_{C4}$ at the predetermined rise rate $\Delta P1_H$ are initiated at the point of time $t_{A3}$. In the prior art of FIG. 11, the commanded control pressure $P_{B1}$ is raised at the predetermined rate during the inertia phase initiated at the point of time $t_{A3}$. As indicated in FIGS. 11 and 12, the output shaft torque $T_{OUT}$ which has been reduced is rapidly increased immediately after the point of time $t_{A3}$. It is noted that the shifting shock of the automatic transmission 10 increases with an increase of an amount of rapid increase $T_{SK}$ (indicated in FIGS. 11 and 12) of the output shaft torque $T_{OUT}$.

At a point of time $t_{A3}'$ in FIG. 12, the degree of progress PG of the shift-up action of the automatic transmission 10 has reached the target shifting progress degree PG1, that is, the turbine speed Nt in the process of being lowered has been lowered to the threshold value N1t corresponding to the target shifting progress degree PG1, so that the affirmative determination is obtained in the step SA8 of FIG. 10, and the step SA10 is implemented according to the present embodiment. Accordingly, the commanded control pressure $P_{B1}$ of the first brake B1 is raised at the predetermined second rate $\Delta P2_{UP}$ while the commanded control pressure $P_{C4}$ of the fourth clutch C4 is lowered at the predetermined fall rate $\Delta P2_H$, during a time period starting at the point of time $t_{A3}'$. In the present embodiment of FIG. 12, the rapid increase of the output shaft torque $T_{OUT}$ by the amount $T_{SK}$ takes place prior to the point of time $t_{A3}'$. That is, the turbine speed Nt has been lowered to the threshold value N1t after the rapid increase of the output shaft torque $T_{OUT}$ which takes place immediately after the moment of initiation of the inertia phase and causes the shifting shock.

At a point of time $t_{A4}$ in FIGS. 11 and 12, the turbine speed Nt which has been lowered as a result of the engaging actions of the first brake B1 and fourth Clutch C4 begins to be influenced by the vehicle speed V, that is, the inertia phase of the shift-action action is terminated, so that the output shaft torque $T_{OUT}$ is reduced to a shifting-termination value at the point of time $t_{A4}$, in the absence of slipping of the first brake B1. At the point of time $t_{A4}$, the affirmative determination in the step SA7 of FIG. 10 according to the present embodiment is changed into the negative determination, so that the commanded control pressures $P_{B1}$, $P_{C4}$ are held at the present values during the time period starting at the point of time $t_{A4}$, as indicated in FIG. 12. In the prior art, the commanded control pressure $P_{B1}$ is similarly held at the present value during the time period starting at the point of time $t_{A4}$.

At a point of time $t_{A5}$ in FIGS. 11 and 12, the synchronous rotary motions of the input and output shafts 22, 24 have been confirmed, and the affirmative determination is obtained in the step SA11 of FIG. 10, so that the step SA12 is implemented according to the present embodiment, whereby the commanded control pressure $P_{B1}$ is rapidly raised to the shifting-termination value at the point of time $t_{A5}$, while the commanded control pressure $P_{C4}$ is rapidly lowered to zero at the point of time $t_{A5}$. In the prior art of FIG. 11, too, the commanded control pressure $P_{B1}$ is rapidly raised to the shifting-termination value at the point of time $t_{A5}$.

The coefficients for the torques Tb1 and Tc4 respectively transmitted through the first brake B1 and the fourth clutch C4, which coefficients are used in the above-indicated equation (1), are respectively 3.1493 and 3.0805, which are almost equal to each other, so that the torques Tb1, Tc4 are considered to have almost the same influences on the output shaft torque $T_{OUT}$, and therefore have almost the same influence on the amount of rapid increase $T_{SK}$ (indicated in FIGS. 11 and 12) of the output shaft torque $T_{OUT}$. In the above-indicated equation (2), on the other hand, the coefficient for the torque Tb1 transmitted through the first brake B1 is −7.6334, while the coefficient for the torque Tc4 transmitted through the fourth clutch C4 is −14.0019 the absolute value of which is about twice as large as the coefficient for the torque Tb1. Accordingly, the transmitted torque value Tc4 causes the turbine speed Nt to be lowered at the rate $\Delta Nt$ the absolute value of which is about twice as high as the rate $\Delta Nt$ at which the transmitted torque value Tb1 causes the turbine speed Nt to be lowered, in the shift-up action from the first gear position "1st" to the second gear position "2nd". For this reason, the present embodiment of FIG. 12 is configured such that the torque capacity of the first brake B1 during the inertia phase between the points of time $T_{A3}$ and $T_{A4}$ is made smaller by an amount corresponding to the torque capacity of the fourth clutch C4 according to the above-indicated equation (1), than in the prior art of FIG. 11 wherein the fourth clutch C4 is held in the fully released state during the inertia phase. Although the amounts of rapid increase $T_{SK}$ representing the degrees of shocking shock of the automatic transmission 10 are substantially the same in the present embodiment of FIG. 12 and the prior art of FIG. 11, the present embodiment is arranged to place the fourth clutch C4 ion the slipping state to enable the fourth clutch C4 to have the transmitted torque value Tc4, so that the turbine speed Nt is lowered at a higher rate to the shifting-termination value in the present embodiment of FIG. 12 than in the prior art of FIG. 11, that is, the period of the inertia phase is shortened in the present embodiment of FIG. 12, as compared with that in the prior art of FIG. 11. Accordingly, the required shifting time from the point of time $t_{A1}$ to the point of time $t_{A5}$ is shortened in the present embodiment of FIG. 12, as compared with that in the prior art of FIG. 11.

The higher-gear-position coupling-element control portion 122 provided according to the present embodiment is configured to enable at least one specially controlled coupling element in the form of the higher-gear-position coupling element (fourth clutch C4 selected by the higher-gear-position coupling-element selecting portion 112) to have a torque capacity during the shifting action (shift-up action) performed according to the presently generated shifting command. The torque capacity of the higher-gear-position coupling element (C4) has a larger influence on the rate of change ΔNt of the turbine speed Nt of the vehicular automatic transmission 10, that the torque capacity of the second coupling element $C_{G2}$ (B1) to be engaged to perform the shift-up action according to the shifting command, as is apparent from the coefficients for the transmitted torques values Tb1, Tc4, so that the specially controlled coupling element enabled to have the torque capacity makes it possible to more rapidly change the turbine speed Nt to the shifting-termination speed corresponding to the gear position of the vehicular automatic transmission 10 established after the shift-up action, than in the case where the specially controlled coupling element is not enabled to have the torque capacity, while at the same time a shifting shock of the vehicular automatic transmission 10 is reduced effectively as in the above-indicated case, whereby the time required for completion of the shift-up action can be effectively shortened.

The higher-gear-position coupling-element control portion 122 according to the present embodiment is further configured to enable the higher-gear-position coupling element in the form of the fourth clutch C4 which is engaged to perform the shifting action to the higher gear position in the form of the fourth gear position "4th", than the gear position (second gear position "2nd") established by the shift-up action of the automatic transmission 10 (from the first gear position "1st" to the second gear position "2nd"), the time required for completion of the shift-up action can be made shorter than in the case where the higher-gear-position coupling element is not enabled to have a torque capacity, while the shifting shock can be reduced effectively as in the above-indicated case.

The higher-gear-position coupling element shift control portion 122 according to the present embodiment is further configured to start lowering the commanded control pressure $P_{GH}$ of the higher-gear-position coupling element (C4) at the predetermined fall rate $\Delta P2_H$, to reduce the torque capacity when the shifting progress determining portion 118 has determined that the degree of progress PG of the shift-up action has reached the predetermined target shifting progress degree PG1. Thus, the torque capacity of the higher-gear-position coupling element is more slowly lowered during the shifting action and zeroed upon termination of the shifting action, than in the case where the reduction of the torque capacity to zero is initiated immediately before the moment of termination of the shift-up action, so that an inadequate control timing of the torque capacity of the higher-gear-position coupling element which would take place during the shifting action would have a reduced adverse influence on the shift-up action.

The higher-gear-position coupling-element control portion 122 according to the present embodiment is further configured such that the commanded control pressure $P_{GH}$ of the higher-gear-position coupling element (C4) is raised to enable the higher-gear-position coupling element to have the torque capacity, in synchronization with the moment of initiation of the inertia phase of the automatic transmission 10, so that the torque capacity of the higher-gear-position coupling element can be effectively generated to shorten the required shifting time of the automatic transmission 10. In this respect, it is noted that the higher-gear-position coupling element (C4) does not have a torque capacity while the commanded control pressure $P_{GH}$ is held at the predetermined low standby pressure. This is also true to the commanded control pressures $P_{G1}$, $P_{G2}$ of the first and second coupling elements $C_{G1}$, $C_{G2}$.

The higher-gear-position coupling-element control portion 122 according to the present embodiment is further configured to enable the higher-gear-position coupling element to have the torque capacity during the shifting action of the automatic transmission 10 from the first gear position G1 to the second gear position G2, by releasing the first coupling element $C_{G1}$ and engaging the second coupling element $C_{G2}$, more specifically, during the shift-up action from the first gear position "1st" to the second gear position "2nd", by releasing the one-way clutch F1 and engaging the first brake B1. Thus, the higher-gear-position coupling element (C4) enabled to have the torque capacity makes it possible to more rapidly change the rotating speed of the input shaft 22 of the automatic transmission 10 to the shifting-termination value corresponding to the second gear position of the automatic transmission 10 established after the shift-up, than in the case where the specially controlled coupling element is not enabled to have the torque capacity, while at the same time the shifting shock of the automatic transmission 10 is reduced effectively as in the above-indicated case, whereby the time required for completion of the shift-up action can be effectively shortened.

The higher-gear-position coupling-element control portion 122 according to the present embodiment is further configured to enable the higher-gear-position coupling element)C4) to have the torque capacity by temporarily placing it in the slipping state or partially engaged state during the shifting action of the automatic transmission 10. Accordingly, the torque capacity of the higher-gear-position coupling element temporarily placed in the slipping state can be adequately adjusted to a value suitable for shortening the required shifting time of the automatic transmission 10, while reducing the shifting shock of the automatic transmission 10.

The shifting phase determining portion 118 according to the present embodiment is configured to determine that the degree of progress PG of the shift-up action of the automatic transmission 10 has reached the predetermined target shifting progress degree PG1, when the turbine speed Nt which falls during the inertia phase of the shift-up action as the shift-up action progresses has been lowered to the threshold value N1t corresponding to the target shifting progress degree PG1.

Thus, the determination as to whether the degree of progress PG has reached the target shifting progress degree PG1 can be easily made by detecting the turbine speed Nt.

The present embodiment is configured such that predetermined target shifting progress degree PG1 is determined so that the degree of progress PG of the shift-up action has reached the target shifting progress degree PG1 after a change of the torque of the output shaft 24 of the automatic transmission 10 which takes place as a shifting shock of the automatic transmission 10 upon or immediately after initiation of the inertia phase has been terminated. Accordingly, the required shifting time of the automatic transmission 10 can be effectively shortened while reducing an influence of an inadequate control timing of the torque capacity of the higher-gear-position coupling element (C4), upon the shift-up action performed according to the presently generated shifting command, while the torque capacity is generated temporarily for a selected length of time during the shift-up action.

There will be described another embodiment of the present invention. In the following description, the same reference signs as used in the first embodiment will be used to identify the same elements, which will not be described redundantly.

<Second Embodiment>

Figure 13:
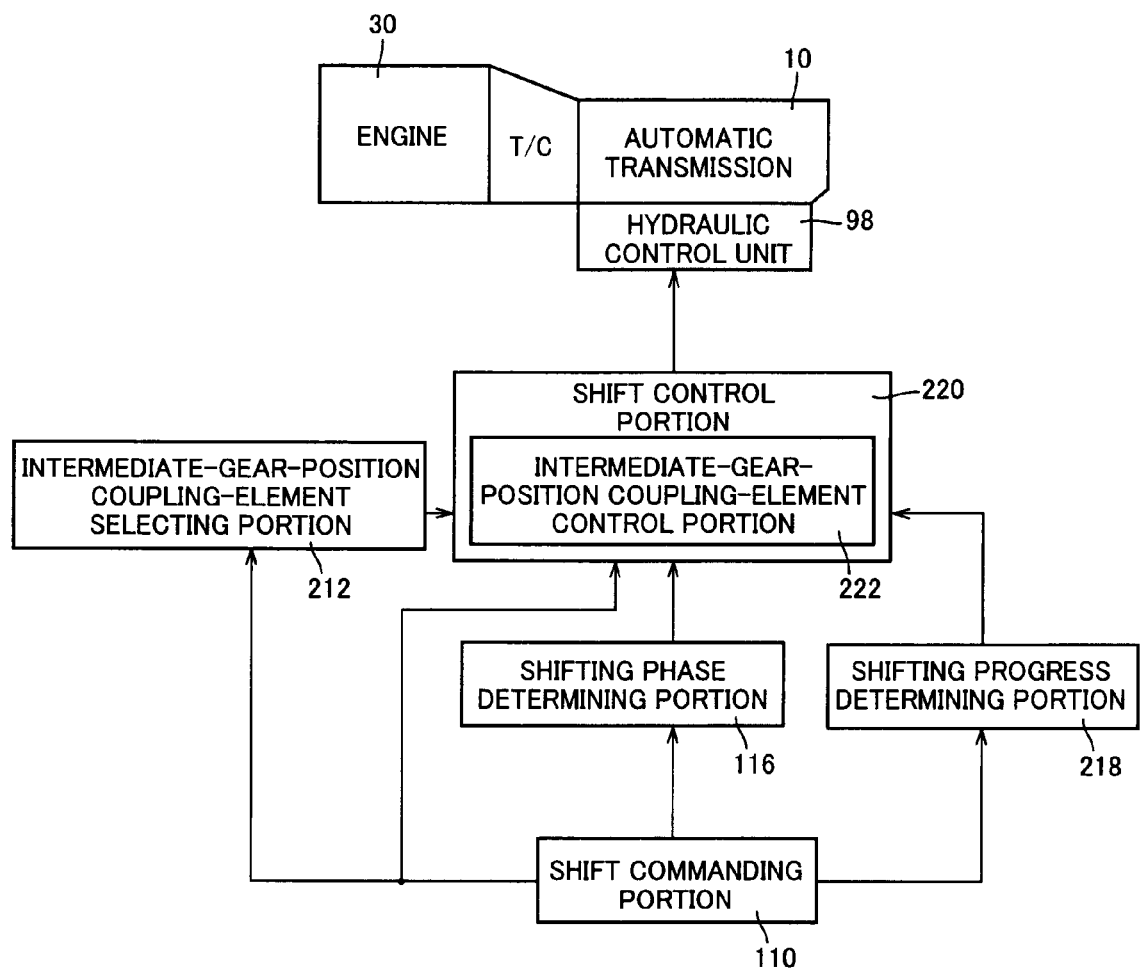
FIG. 13 is a functional block diagram corresponding to that of FIG. 8, illustrating major functional portions of the electronic control device of FIG. 4 according to a second embodiment of this invention.

Referring to the functional block diagram of FIG. 13, there are illustrated major control functions of the electronic control device 90 constructed according to the second embodiment of this invention. The electronic control device 90 according to the present embodiment of FIG. 13 includes an intermediate-gear-position coupling-element selecting portion 212, a shifting progress determining portion 218 and a shift control portion 220, in place of the higher-gear-position coupling-element selecting portion 112, shifting progress determining portion 118 and a shift control portion 120 provided in the first embodiment illustrated in the functional block diagram of FIG. 8. The shift commanding portion 220 includes an intermediate-gear-position coupling-element control portion 222. Like the first embodiment of FIG. 8, the second embodiment includes the shifting phase determining portion 116 and the shift commanding portion 110. Only the aspects of this second embodiment that are different from the first embodiment will be described.

The shift commanding portion 110 in the second embodiment is also configured to make the determination as to whether a shifting action of the automatic transmission 10 should be performed, on the basis of the actual vehicle speed V and operating amount $A_{CC}$ of the accelerator pedal, 50 and according to the stored shifting boundary line map indicated in FIG. 6, and to generate a shifting command to perform the shifting action when the affirmative determination is obtained. When the operating amount $A_{CC}$ of the accelerator pedal 50 increases from a point "c" to a point "d" indicated in FIG. 6, in the fourth gear position "4th" of the automatic transmission 10, the shift commanding portion 110 determines that a jump shift-down action from the fourth gear position "4th" to the second gear position "2nd" should take place, and generates a shifting command to perform the jump shift-down action of the automatic transmission 10 from the fourth gear position "4th" to the second gear position "2nd".

The intermediate-gear-position coupling element selecting portion 212 is configured to select at least one intermediate-gear-position coupling element which is the coupling element to be engaged to establish an intermediate gear position of the automatic transmission 10 and which is placed in the released state prior and subsequent to the shift-down action performed according to the shifting command generated by the shift commanding portion 110. The intermediate gear position is intermediate between the gear position established before said shift-down action and the gear position established after said shift-down action, and is the lower gear position than the gear position established before the shift-down action and the higher gear position than the gear position established after the shift-down action. It will be understood that like the higher-gear-position coupling element in the first embodiment, the intermediate-gear-position coupling element is also the specially controlled coupling element which is included in the plurality of coupling elements (C, B, F) provided to perform the shifting actions of the automatic transmission 10 and which is placed in the fully released state prior and subsequent to the shifting action performed according to the presently generated shifting command. In other words, the intermediate-gear-position coupling element is the coupling element which is other than the first and second coupling elements $C_{G1}$, $C_{G2}$ and which is engaged to establish the gear position lower than the first gear position G1 and higher than the second gear position G2. When the shifting command to perform the shift-down action from the fourth gear position "4th" to the second gear position "2nd" is generated by the shift commanding portion 110, for example, the intermediate-gear-position coupling-element selecting portion 212 selects at least one of the intermediate-gear-position coupling elements in the form of the third clutch C3 as the higher-gear-position coupling element, as is apparent from the table of FIG. 2.

The shifting progress determining portion 218 is configured to determine whether the degree of progress PG of the shifting action of the automatic transmission 10 has reached a predetermined target degree PGx (hereinafter referred to as "target shifting progress degree PGx"), that is, the degree of progress PG is higher than the target shifting progress degree PGx. The shifting progress determining portion 218 is different from the shifting progress determining portion 118 in the first embodiment in that the target shifting progress degree PGx is used by the shifting progress determining portion 218, in place of the target shifting progress degree PG1. In the other aspect, the shifting progress determining portion 218 is identical with the shifting progress determining portion 118.

Like the target shifting progress degree PX1, the target shifting progress degree PGx is determined such that the degree of progress PG of the shifting action reaches the target shifting progress degree PGx during the inertia phase of the shifting action. However, the target shifting progress degree PGx is different from the target shifting progress degree PG1 in that the target shifting progress degree PGx is determined such that the degree of progress PG reaches the target shifting progress degree PGx during a time period from the moment of initiation of the inertial phase to a moment of initiation of synchronous rotary motions of the input and output members of the intermediate-gear-position coupling element. In the first embodiment, the threshold value N1t used for the determination as to whether the degree of progress PG has reached the target shifting progress degree PG1 is determined so as to correspond to the target shifting progress degree PG1, on the basis of the turbine speed Nt at the moment of termination of the inertia phase. In the second embodiment, however, the threshold value N1t is determined so as to correspond to the target shifting progress degree PGx, on the basis of a synchronous speed Ntm which is the turbine speed Nt at the moment of initiation of the synchronous rotary motions of the input and output members of the intermediate-gear-position coupling element. The synchronous speed Ntm can be calculated on the basis of the gear positions established before and after the shift-down action of the automatic transmission 10, and the rotating speed $N_{OUT}$ of the output shaft 24, provided the clutch C or brake B selected as the intermediate-gear-position coupling element is known.

The shifting control portion 220 is configured to control the hydraulic control unit 98 according to the shifting command generated by the shift commanding portion 110 to perform the clutch-to-clutch jump shift-down action, for controlling the jump shift-down action from the first gear position G1 to the second gear position G2 by releasing the first coupling element $C_{G1}$ (releasing-side coupling element $C_{G1}$) while at the same time engaging the second coupling element $C_{G2}$ (engaging-side coupling element $C_{G2}$). The above-described intermediate-gear-position coupling-element control portion 222 of the shift control portion 220 is configured to control at least one of the intermediate-gear-position coupling elements selected by the intermediate-gear-position coupling-element selecting portion 212 such that each selected intermediate-gear-position coupling element is temporarily placed in a partially engaged or slipping state (not in the fully engaged state) during the shifting action (shift-down action) of the automatic transmission 10, to cause the intermediate-gear-position coupling element to have a torque capacity. The shift control portion 220 (intermediate-gear-position coupling-element control portion 222) controls the releasing action of the first coupling element $C_{G1}$, the engaging action of the second coupling element $C_{G2}$, and the slipping action of the intermediate-gear-position coupling element(s) in synchronization with each other, by changing the commanded control pressures (commanded amounts of electric current) of those coupling elements, as described below in detail. The shift control portion 220 performs a control operation similar to that of the shift control portion 120, while the intermediate-gear-position coupling-element control portion 222 performs a control operation similar to that of the higher-gear-position coupling-element control portion 122, until the shifting phase determining portion 116 has determined that the inertia phase has been initiated. However, the control operation of the intermediate-gear-position coupling-element control portion 222 applies to the intermediate-gear-position coupling element, while the control operation of the higher-gear-position coupling-element control portion 122 applies to the higher-gear-position coupling element.

When the shifting phase determining portion 116 determines that the shift-down action has entered or initiated the inertia phase, while the shifting command to perform the shift-down action is generated by the shift commanding portion 110, the shift control portion 220 further raises the commanded control pressure $P_{G2}$ of the second coupling element $C_{G2}$ (which has been raised in the torque phase) at a predetermined first rate $\Delta P1_{DN}$, and the intermediate-gear-position coupling-element control portion 222 raises a commanded control pressure $P_{GM}$ of the intermediate-gear-position coupling element from the low standby pressure at a predetermined rise rate $\Delta P1_M$, to increase the torque capacity of the intermediate-gear-position coupling element. That is, the intermediate-gear-position coupling-element control portion 222 raises the commanded control pressure $P_{GM}$ at the moment of initiation of the inertia phase of the shift-down action of the automatic transmission 10, for enabling the intermediate-gear-position coupling element to have a torque capacity.

When the shifting progress determining portion 218 then determines that the degree of progress PG of the shift-down action has reached the target shifting progress degree PGx after the initiation of the inertia phase, the shift control portion 220 raises the commanded control pressure $P_{G2}$ of the second coupling element $C_{G2}$ at a predetermined second rate $\Delta P2_{DN}$, and the intermediate-gear-position coupling-element control portion 222 terminates the rise of the commanded control pressure $P_{GM}$ of the intermediate-gear-position coupling element at the rise rate $\Delta P1_M$, and lowers the commanded control pressure $P_{GM}$ at a predetermined fall rate $\Delta P2_M$, to reduce the torque capacity of the intermediate-gear-position coupling element.

When the shifting command to perform the shift-down action of the automatic transmission 10 is generated, and before the rise of the commanded control pressure $P_{GM}$ of the intermediate-gear-position coupling element is initiated, the intermediate-gear-position coupling-element control portion 222 calculates the above-described synchronous speed Ntm on the basis of the clutch C or brake B selected as the intermediate gear position, the gear positions established before and after the shift-down action, and the rotating speed $N_{OUT}$ of the output shaft 24. During the inertia phase, the intermediate-gear-position coupling-element control portion 222 determines whether the turbine speed Nt has reached the calculated synchronous speed Ntm, that is, whether the present turbine speed Nt has exceeded the synchronous speed Ntm. If the affirmative determination is obtained, that is the present turbine speed Nt is higher than the synchronous speed Ntm, the intermediate-gear-position coupling-element control portion 222 lowers the commanded control pressure $P_{GM}$ to a value lower than the low standby pressure, for instance, to zero the commanded control pressure $P_{GM}$. When the above-indicated affirmative determination is obtained, the shift control portion 220 changes the rate of rise of the commanded control pressure $P_{G2}$ of the second coupling element $C_{G2}$, that is, raises the commanded control pressure $P_{G2}$ at a predetermined third rate $\Delta P3_{DN}$.

When the shifting phase determining portion 116 then determines that the inertia phase of the shift-down action has been terminated, the shift control portion 220 terminates the rise of the commanded control pressure $P_{G2}$ of the second coupling element $C_{G2}$ at the third rate $\Delta P2_{DN}$, and holds the commanded control pressure $P_{G2}$ at the present value, and the intermediate-gear-position coupling-element control portion 222 holds the commanded control pressure $P_{G2}$ of the intermediate-gear-position coupling element at the low standby pressure or at a value lower than the low standby pressure.

When the shifting phase determining portion 116 then determines that the input shaft 22 and the output shaft 24 initiate the synchronous rotary motions, the shift control portion 220 rapidly raises the commanded control pressure $P_{G2}$ of the second coupling element $C_{G2}$ to the predetermined shifting-termination pressure, which is the engaging pressure of the second coupling element $C_{G2}$ placed in the fully engaged state, and the intermediate-gear-position coupling-element control portion 222 rapidly lowers the commanded control pressure $P_{GM}$ of the intermediate-gear-position coupling element to zero, for fully releasing the intermediate-gear-position coupling element.

As in the first embodiment, the target values of the rate of change of the output shaft torque $T_{OUT}$ and target values of the rate of change of the turbine speed Nt during the shifting actions (shift-down actions) of the automatic transmission 10 are determined by experimentation, for the respective shifting actions, so as to reduce the required shifting times while reducing the shifting shocks, for improving the driving comfort of the vehicle. The above-described first rate $\Delta P1_{DN}$, second rate $\Delta P2_{DN}$, third rate $\Delta P3_{DN}$, rise rate $\Delta P1_M$ and drop rate $\Delta P2_M$, which are parameters to control the commanded control pressure $P_{G2}$ of the second coupling element $C_{G2}$ and the commanded control pressure $P_{GM}$ of the intermediate-gear-position coupling element, are determined according to the motion equations of the rotary elements of the automatic transmission 10, so as to establish the target values of the rate of change of the output shaft torque $T_{OUT}$ and the target values of the rate of change of the turbine speed Nt. Further, the rise rate $\Delta P1_M$ and drop rate $\Delta P2_M$ for the intermediate-gear-position coupling element are determined to enable this coupling element to have a torque capacity by placing the coupling element in the slipping sate (non-fully-engaged state), as in the first embodiment.

When the shifting command to perform the clutch-to-clutch shift-up action is generated by the shift commanding portion 110, the shift control portion 220 controls this shift-down action such that the releasing action of the first coupling element $C_{G1}$ and the engaging action of the second coupling element $C_{G2}$ are initiated, and concurrently placed in the slipping states before the first and second coupling elements $C_{G1}$, $C_{G2}$ are eventually brought into the fully released and engaged states, respectively, as in the clutch-to-clutch shifting action controlled according to the prior art.

Figure 14:
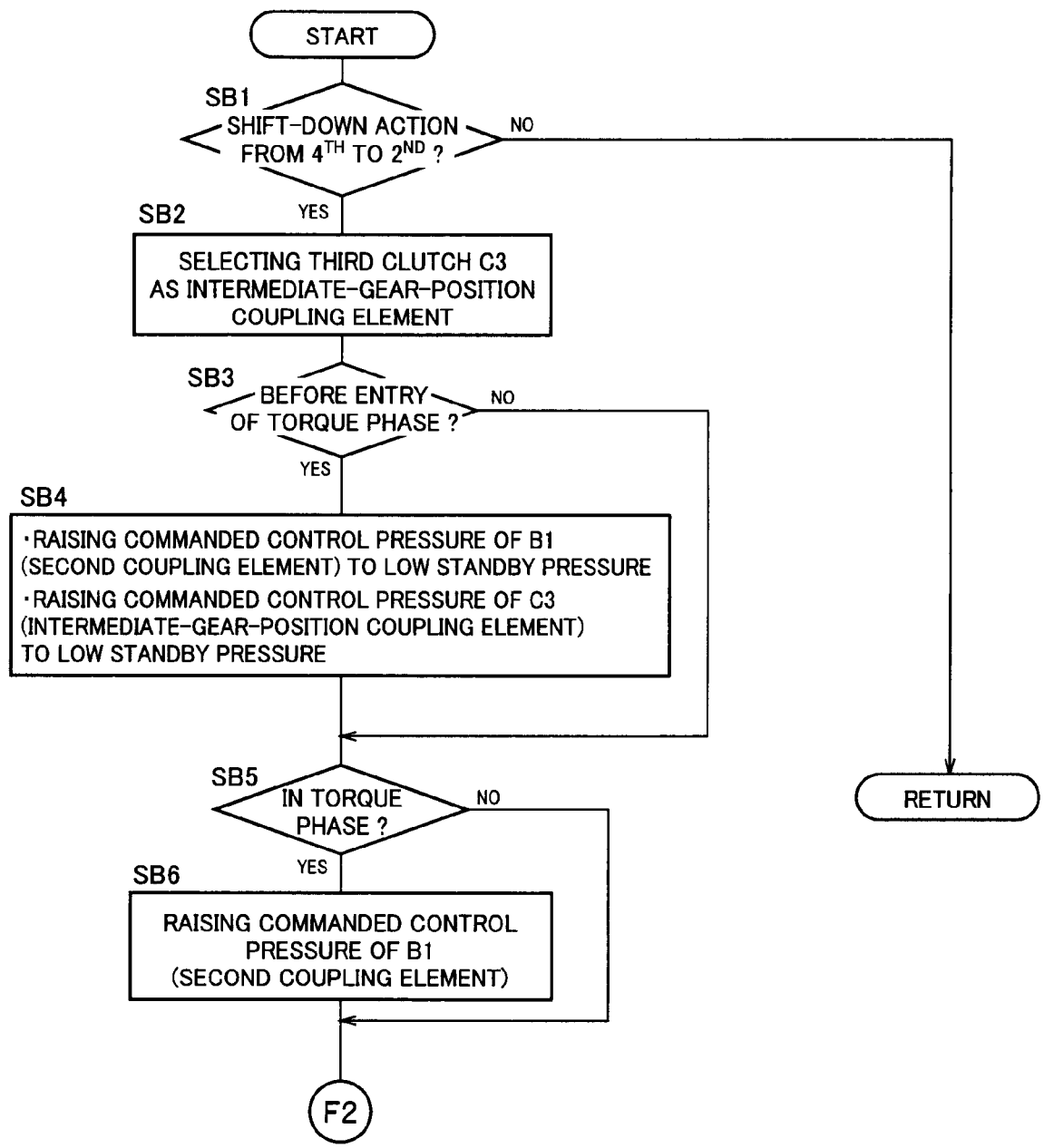
FIG. 14 is a flow chart corresponding to that of FIG. 9, illustrating a part of a control routine executed by the electronic control device of FIG. 4 according to the second embodiment when a shift-down action of the automatic transmission from a fourth gear position to the second gear position is performed with the engaging action of the first brake.
Figure 15:
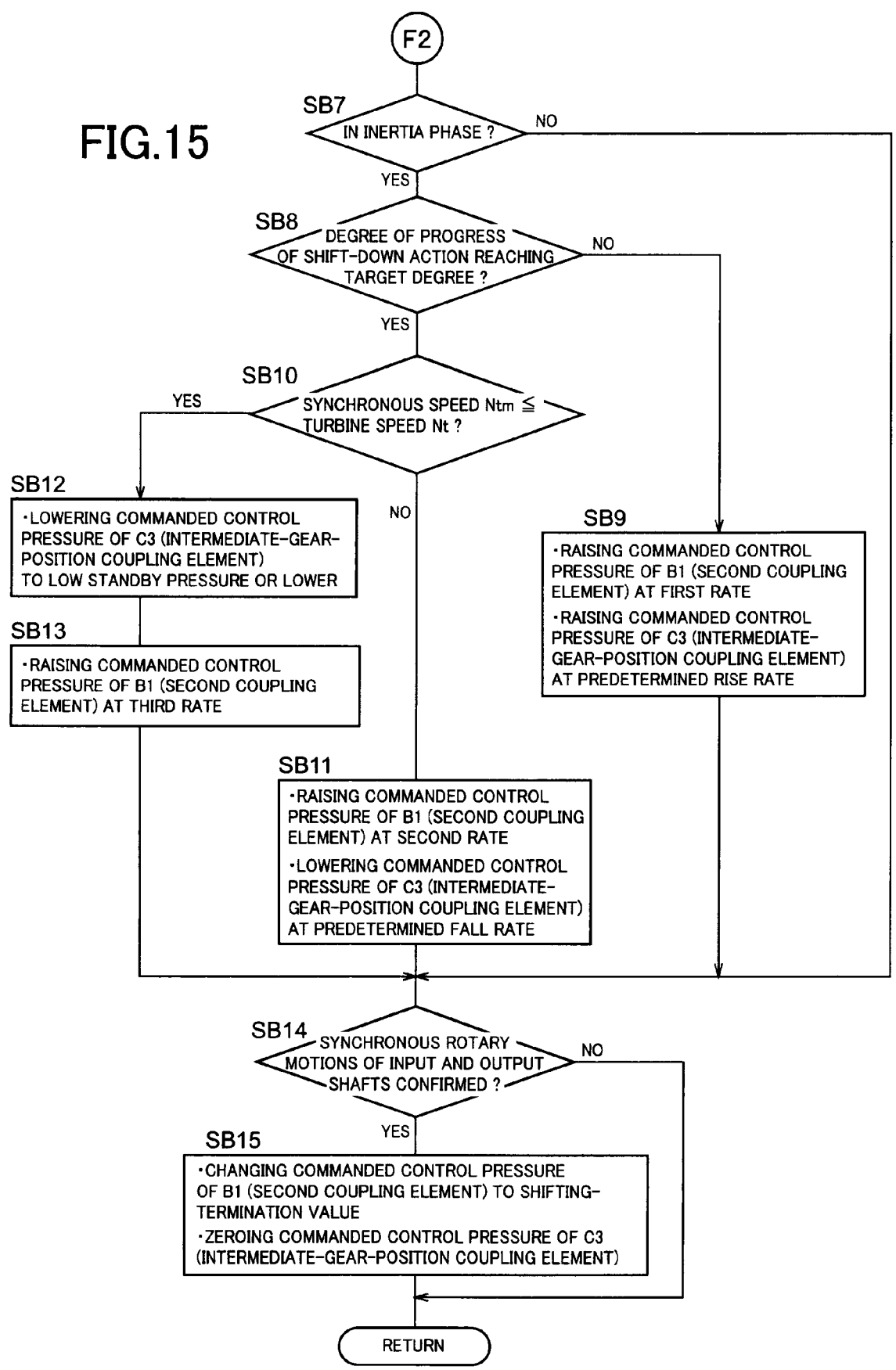
FIG. 15 is a flow chart illustrating the remaining part of the control routine of FIG. 14.

Referring to the flow charts of FIGS. 14 and 15 corresponding to those of FIGS. 9 and 10 of the first embodiment, there is illustrated a major control operation of the electronic control device 90 according to the second embodiment, that is, a control routine to control the jump shift-down action of the automatic transmission 10 from the fourth gear position "4th" to the second gear position "2nd", more specifically, to control the releasing action of the first coupling element $C_{G1}$ in the form of the fourth clutch C4, the engaging action of the second coupling element $C_{G2}$ in the form of the first brake B1 and the temporary slipping action of the intermediate-gear-position coupling element in the form of the third clutch C3, by way of example. This control routine is repeatedly executed with an extremely short cycle time of about several milliseconds to about several tens of milliseconds.

The control routine is initiated with step SB1 corresponding to the shift commanding portion 110, to make the determination as to whether the jump shift-down action of the automatic transmission 10 from the fourth gear position "4th" to the second gear position "2nd" should take place, on the basis of the actual vehicle speed V and operating amount $A_{CC}$ of the accelerator pedal 50 and according to the shifting boundary line map of FIG. 6. When the affirmative determination is obtained in step SB1, that is, when it is determined that the slipping shift-down action from the fourth gear position "4th" to the second gear position "2nd" should take place, the control flow goes to step SB2. If the negative determination is obtained in step SB1, one cycle of execution of the control routine is terminated.

In the step SB2 corresponding to the intermediate-gear-position coupling-element selecting portion 212, to select the third clutch C3 as the intermediate-gear-position coupling element. The third clutch C3 is engaged to establish the third gear position "3rd" which is intermediate between the fourth gear position "4th" and the second gear position "2nd", which is the lower gear position than the first gear position G1 in the form of the fourth gear position "4th" and the higher gear position than the second gear position G2 in the form of the second gear position "2nd".

The step SB2 is followed by step SB3 corresponding to the shifting phase determining portion 116, to determine whether the shift-down action of the automatic transmission 10 from the fourth gear position "4th" to the second gear position "2nd" is prior to the entry or initiation of the torque phase. Described more specifically, the length of time which has passed after the moment of generation of the shifting command to perform the shift-down action is measured. When the measured length of time is shorter than the above-described predetermined threshold time length corresponding to the moment of initiation or entry of the torque phase, the affirmative determination is obtained in the step SB3, that is, it is determined that the jump shift-down action in question is prior to the initiation of the torque phase. In this case, the control flow goes to step SB4. If the negative determination is obtained in the step SB3, the control flow goes to step SB5 while skipping the step SB4.

In the step SB4 corresponding to the shift control portion 220 and its intermediate-gear-position coupling-element control portion 222, the commanded control pressure $P_{B1}$ of the first brake B1 (second coupling element $C_{G2}$) is raised to the predetermined low standby pressure described above. Concurrently, the commanded control pressure $P_{PC3}$ of the third clutch C3 (intermediate-gear-position coupling element) is raised to the predetermined low standby pressure described above. In the initial period of rising of the commanded control pressures of the first brake B1 and third clutch C3 to the low standby pressure, these commanded control pressures are quickly raised for fast temporary partial engagement of the first brake B1 and third clutch C3 before the commanded control pressures are held at the low standby pressures.

In the following step SB5 also corresponding to the shifting phase determining portion 116, the determination as to whether the shift-down action from the fourth gear position "4th" to the second gear position "$2^{nd}$" is in the torque phase is made. When the measured time which has passed after the moment of generation of the shifting command to perform the shift-down action from the fourth gear position "4th" to the second gear position "$2^{nd}$" has exceeded the predetermined threshold time length, it is determined that the torque phase of the shift-down action in question has been initiated. When a rise of the turbine speed Nt due to the shift-down action has been initiated, it is determined that the torque phase has been terminated. When the shift-down action in question is in the torque phase, that is, when the affirmative determination is obtained in the step SB5, the control flow goes to step SB6. When the negative determination is obtained in the step SB5, the control flow goes to step SB7 (FIG. 15).

In the step SB6 corresponding to the shift control portion 220, the commanded control pressure $P_{B1}$ of the first brake B1 (second coupling element $C_{G2}$) is raised at the predetermined rate to increase the torque capacity of the first brake B1, as in the clutch-to-clutch shifting action controlled according to the prior art. During the torque phase, the commanded control pressure $P_{C3}$ of the third clutch C3 (intermediate-gear-position coupling element) remains at the predetermined low standby pressure.

In the step SB7 also corresponding to the shifting phase determining portion 116, the determination as to whether the shift-down action in question is in the inertia phase. When it is determined that the torque phase has been terminated, it is determined that the inertia phase has been initiated. When it is determined that the rise of the turbine speed Nt due to the shift-down action has been terminated, it is determined that the inertia phase has been terminated. When the shift-down action in question is in the inertia phase, that is, when the affirmative determination is obtained in the step SB7, the control flow goes to step SBA8. When the negative determination is obtained in the step SBA7, the control flow goes to step SB14 while skipping steps SB8-SB13.

In the step SB8 corresponding to the shifting progress determining portion 218, the determination as to whether the degree of progress PG of the shift-down action of the automatic transmission 10 has reached the predetermined target shifting progress degree PGx. When the turbine speed Nt which rises as the inertial phase of the shift-down action in question progresses is higher than the threshold value N1t corresponding to the target shifting progress degree PGx, it is determined that the degree of progress PG has reached the target shifting progress degree PGx. When the degree of progress PG of the shift-down action of the automatic transmission portion 10 has reached the target shifting progress degree PGx, that is, when the affirmative determination is obtained in the step SB8, the control flow goes to step SB10. When the negative determination is obtained in the step SB8, the control flow goes to step SB9.

In the step SA9 corresponding to the shift control portion 220 and the intermediate-gear-position coupling-element control portion 222, the commanded control pressure PB1 of the first brake B1 (second coupling element $C_{G2}$) is raised at the above-described predetermined first rate $\Delta P1_{DN}$. Concurrently, preferably, in synchronization with the rise of the commanded control pressure $P_{B1}$, the commanded control pressure $P_{C3}$ of the third clutch C3 (intermediate-gear-position coupling element) is raised at the above-described predetermined rise rate $\Delta P1_M$. The step SB9 is followed by step SB14.

In the step SB10 corresponding to the intermediate-gear-position coupling-element control portion 222, the determination as to whether the present turbine speed Nt is higher than the above-described synchronous speed Ntm. When the affirmative determination is obtained in the step SB10, that is, when it is determined that the present turbine speed Nt is higher than the above-described synchronous speed Ntm, the control flow goes to step SB12. When the negative determination is obtained in step SB10, the control flow goes to step SB11.

In the step SB11 also corresponding to the shift control portion 220 and the intermediate-gear-position coupling-element control portion 222, the commanded control pressure $P_{B1}$ of the first brake B1 (second coupling element $C_{G2}$) is raised at the above-described predetermined second rate $\Delta P2_{DN}$. Concurrently, preferably, in synchronization with the rise of the commanded control pressure $P_{B1}$, the commanded control pressure $P_{C3}$ of the third clutch C3 (intermediate-gear-position coupling element) is lowered at the above-described predetermined fall rate $\Delta P2_M$. The step SB11 is followed by step SB14.

In the step SB12 corresponding to the intermediate-gear-position coupling-element control portion 222, the commanded control pressure $P_{C3}$ of the third clutch C3 (intermediate-gear-position coupling element) is lowered to the low standby pressure or to a value lower than the lower standby pressure, for example, lowered to zero. The step SB12 is followed by step SB13.

In the step SB13 also corresponding to the shift control portion 220, the rate of rise of the commanded control pressure $P_{B1}$ of the first brake B1 (second coupling element $C_{G2}$) is changed from the second rate $\Delta P2_{DN}$ to the third rate $\Delta P3_{DN}$ in synchronization with the fall of the commanded control pressure $P_{C3}$ to the lower standby pressure or lower in the step SB12. The step SB13 is followed by step SB14.

In the step SB14 also corresponding to the shifting phase determining portion 116, the determination is made to confirm the synchronous rotary motions of the input shaft 22 and the output shaft 24. Theoretically, the inertial phase of the shift-down action in question is terminated at the moment when the rotary motions of the input and output shafts 22, 24 have been confirmed. However, the electronic control device 90 requires a short time to confirm the synchronous rotary motions of the input and output shafts 22, 24, so that the synchronous rotary motions have been confirmed the short time after the moment of termination of the inertia phase. When the rotary motions have been confirmed, that is, when the affirmative determination is obtained in the step SB14, the control flow goes to step SB15. When the negative determination is obtained in the step SB14, one cycle of execution of the present control routine is terminated.

In the step SB15 also corresponding to the shift control portion 220 and intermediate-gear-position coupling-element control portion 222, the commanded control pressure $P_{B1}$ of the first brake B1 (second coupling element $C_{G2}$) is immediately raised to the predetermined shifting-termination value, as in the clutch-to-clutch shifting action controlled according to the prior art. Concurrently, preferably, in synchronization with the rise of the commanded control pressure $P_{B1}$ to the shifting-termination value, the commanded control pressure $P_{C3}$ of the third clutch C3 (intermediate-gear-position coupling element) is immediately lowered to zero to bring the third clutch C3 into the fully released state. When the first brake B1 has been placed in the fully engaged state with the commanded control pressure $P_{B1}$ being raised to the shifting-termination value, while the third clutch C3 has been placed in the fully released state with the commanded control pressure $P_{C3}$ being zeroed, the shift-down action from the fourth gear position "4th" to the second gear position "2nd" is terminated or completed, and the shifting command is canceled.

In the shift-down action from the fourth gear position "4th" to the second gear position "2nd", the first coupling element $C_{G1}$ in the form of the fourth clutch C4 is fully released concurrently with the engaging action of the second coupling element $C_{G2}$ in the form of the first brake B1, as in the clutch-to-clutch shifting action controlled according to the prior art.

Referring next to the time chart of FIG. 16 corresponding to that of FIG. 12 of the first embodiment, there will be described the shift-down action of the automatic transmission 10 controlled according to the present second embodiment wherein the selected intermediate-gear-position coupling element is temporarily placed in the slipping state to enable this coupling element to have a torque capacity, with the commanded control pressure $P_{C3}$ being temporarily raised during the shift-down action. In the time chart of FIG. 16, there are indicated the turbine speed Nt, commanded control pressure $P_{B1}$ of the first brake B1 (second coupling element $C_{G3}$) and commanded control pressure $P_{C3}$ of the third clutch C3 (intermediate-gear-position coupling element), in the order of description from the top toward the bottom.

In the shift-up action controlled according to the first embodiment, the turbine speed Nt is lowered in the inertia phase as indicated in the time chart of FIG. 12. In the shift-down action controlled according to the second embodiment, however, the turbine speed Nt is raised in the inertia phase as indicated in the time chart of FIG. 16. While the time chart of FIG. 12 indicates a change of the commanded control pressure $P_{C4}$ of the fourth clutch C4 (higher-gear-position coupling element), the time chart of FIG. 16 indicates a change of the commanded control pressure $P_{C3}$ of the third clutch C3 (intermediate-gear-position coupling element). It is also noted that the time chart of FIG. 16 indicates a point of time $t_{B4}$ not corresponding to any points of time indicated in the time chart of FIG. 12. In the other aspects, the time chart of FIG. 16 is identical with the time chart of FIG. 12. Only the aspects of the second embodiment of FIG. 16 which are different from the first embodiment of FIG. 12 will be described. Points of time $t_{B1}$, $t_{B2}$, $t_{B3}$, $t_{B3}'$, $t_{B5}$ and $t_{B6}$ indicated in FIG. 16 respectively correspond to the points of time $t_{A1}$, $t_{A2}$, $t_{A3}$, $t_{A3}'$, $t_{A4}$ and $t_{A5}$ indicated in FIG. 12.

Figure 16:
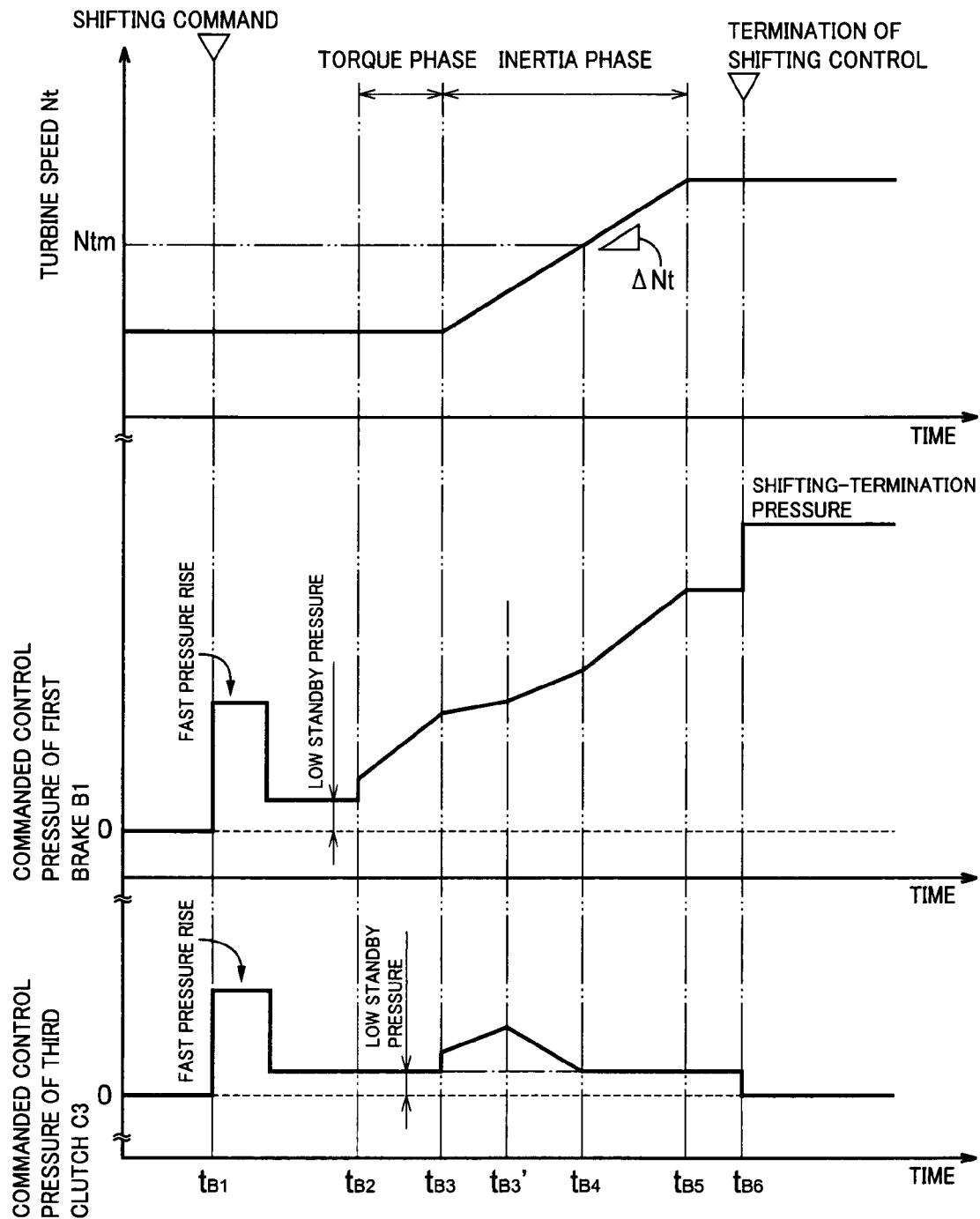
FIG. 16 is a time chart indicating the shift-down action from the fourth gear position to the second gear position, which is controlled by the electronic control device of FIG. 4 according to the second embodiment of this invention, wherein a commanded control pressure of a third clutch (intermediate-gear-position coupling element) is raised to place the third clutch in a slipping state during the shift-down action.

At the point of time $t_{B4}$ indicated in FIG. 16, the turbine speed Nt has been raised to a value higher than the synchronous speed Ntm. At this point of time $t_{B4}$, therefore, the affirmative determination is obtained in the step SB10 of FIG. 15, and the control flow goes to the steps SB12 and SB13. Accordingly, the commanded control pressure $P_{C3}$ of the third clutch C3 (intermediate-gear-position coupling element) which has been lowered at the fall rate $\Delta P2_M$ during the time period starting at the point of time $t_{B3}'$ is lowered to the low standby pressure (or lower), at the point of time $t_{B4}$. Further, the rate of rise of the commanded control pressure $P_{B1}$ of the first brake B1 (second coupling element $C_{G2}$) which has been raised at the rise rate $\Delta P2_{DN}$ during the time period starting at the point of time $t_{B3}'$ is changed from the rate $\Delta P2_{DN}$ to the third rate $\Delta P3_{DN}$ at the point of time $t_{B4}$.

The present second embodiment has substantially the same advantages as the first embodiment, irrespective of the different types of shifting action of the automatic transmission 10, namely, the shift-up action in the first embodiment and the shift-down action in the second embodiment. The intermediate-gear-position coupling-element control portion 222 according to the second embodiment holds the commanded control pressure $P_{GM}$ of the intermediate-gear-position coupling element at the predetermined low standby pressure (or lower) while the turbine speed Nt is higher than the synchronous speed Ntm in the inertia phase of the shift-down action of the automatic transmission 10. Namely, the intermediate-gear-position coupling element is held in the slipping state to enable it to have the torque capacity for the time period from the moment of initiation of the inertia phase of the shift-down action of the automatic transmission 10 to the moment at which the synchronous motions of the input and output members of the intermediate-gear-position coupling element are initiated. After the moment of initiation of the synchronous motions, the intermediate-gear-position coupling element is not enabled to have the torque capacity, since the torque capacity generated after this moment undesirably causes an increase of the time required for the shift-down action. In the present embodiment, the intermediate-gear-position coupling element does not have a torque capacity while the commanded control pressure $P_{GM}$ of the intermediate-gear-position coupling element is held at the predetermined low standby pressure. Similarly, the first and second coupling elements $C_{G1}$, $C_{G2}$ do not have a torque capacity while the commanded control pressures $P_{G1}$, $P_{G2}$ are held at the predetermined low standby pressure.

While the preferred embodiments of this invention have been described above in detail by reference to the drawings, for illustrative purpose only, it is to be understood that the present invention may be embodied with various changes, modifications and improvements, which may occur to those skilled in the art, in the light of the foregoing teachings.

In the first embodiment, the higher-gear-position coupling-element selecting portion 112 selects the fourth clutch C4 as the higher-gear-position coupling element to be placed in the slipping state in the process of the shift-up action from the first gear position "1st" to the second gear position "2nd". However, the higher-gear-position coupling-element selecting portion 112 selects two or all of the second clutch C2, third clutch C3 and fourth clutch C4 as the higher-gear-position coupling elements. In this case, the coefficients used in the above-indicated equations (1) and (2) are changed according to the selected two or three higher-gear-position coupling elements.

In the first embodiment of the flow charts of FIGS. 9 and 10, the first coupling element $C_{G1}$ in the form of the one-way clutch F1 is released to perform the shift-up action from the first gear position "1st" to the second gear position "2nd". However, the first coupling element $C_{G1}$ may be a hydraulically operated clutch C or brake B.

Although the shift-up action from the first gear position "1st" to the second gear position "2nd" according to the first embodiment has been described by reference to the flow charts of FIGS. 9 and 10, by way of example, the principle of the present invention is equally applicable to any other shift-up action, for instance, to the shift-up action from the third gear position "3rd" to the fourth gear position "4th", wherein the third gear position "3rd" corresponds to the first gear position G1 while the fourth gear position "4th" corresponds to the second gear position G2. Similarly, the principle of the present invention is equally applicable to any shift-down action other than the shift-down action from the fourth gear position "4th" to the second gear position "2nd" according to the illustrated second embodiment, The first embodiment is arranged to temporarily place the selected higher-gear-position coupling element in the slipping state to enable this coupling element to have a torque capacity, for the purpose of shortening the time required to perform the shift-up action as is apparent from the time charts of FIGS. 11 and 12, while the shifting shock is reduced to the same extent as in the conventional clutch-to-clutch shifting actions. However, the first embodiment may be modified to temporarily place the selected higher-gear-position coupling element in the slipping state, for the purpose of reducing the shifting shock while the required shift-up time is reduced to the same extent as in the conventional clutch-to-clutch shift-up actions. A similar modification is applicable to the second embodiment, to place the intermediate-gear-position coupling element in the slipping state, for the purpose of reducing the shifting shock while the required shift-down time is reduced to the same extent as in the conventional clutch-to-clutch shift-down actions.

In the illustrated first and second embodiments, the shifting progress determining portions 118, 218 are configured to determine that the degree of progress PG of the shifting action has reached the predetermined target shifting progress degree PG1, PGx, when the turbine speed Nt has reached the threshold value N1t. However, the shifting progress determining portions 118, 218 may make the determination of the degree of progress PG on the basis of a parameter other than the turbine speed Nt.

The second embodiment according to the time chart of FIG. 16 is configured such that the commanded control pressure $P_{C3}$ of the third clutch C3 (intermediate-gear-position coupling element) is lowered to the low standby pressure at the point of time $t_{B4}$. However, the point of time at which the commanded control pressure $P_{C3}$ of the third clutch C3 is lowered to the low standby pressure may be more or less prior or subsequent to the point of time $t_{B4}$. In the shift-down action, however, it is preferable that the commanded control pressure $P_{C3}$ ($P_{GM}$) has been lower to the low standby pressure or lower before the turbine speed Nt has been raised to the above-described synchronous speed Ntm.

In the first embodiment of the time chart of FIG. 12, the commanded control pressure $P_{B1}$ of the first brake B1 is continuously raised during the inertia phase from the point of time $t_{A3}$ to the point of time $t_{A4}$. However, this control of the commanded control pressure $P_{B1}$ during the inertia phase is not essential. For example, the first embodiment may be modified such that the commanded control pressure $P_{B1}$ is lowered from the point of time $t_{A3}$ to the point of time $t_{A3}'$, while at the same time the commanded control pressure $P_{C4}$ of the fourth clutch C4 is raised at the rise rate $\Delta P1_H$ which is higher than that in the first embodiment, by an amount corresponding to the rate at which the commanded control pressure $P_{B1}$ is lowered. A similar modification is applicable to the second embodiment, wherein the commanded control pressure $P_{C3}$ of the third clutch C3 is raised at the increased rise rate $\Delta P1_M$.

The hydraulically operated coupling devices in the form of the clutches C and brakes B (such as the first and second clutches C1, C2) provided in the illustrated automatic transmission 10 may be replaced by magnetic-power type or electromagnetic coupling elements such as magnetic-power type clutches and electromagnetic type clutches, the torque capacities of which are adjustable. Where the electromagnetic clutches are used, for example, the hydraulic control unit 98 incorporating valve devices for hydraulic switching is replaced by an electric or electromagnetic switching device for controlling electric command signals to the electromagnetic clutches.

The shift-up and shift-down actions of the automatic transmission 10 have been described with respect to the first and second embodiments, the control features of the first and second embodiments may be suitably combined together. For example, the control routine of FIGS. 14 and 15 is executed before or after the control routine of FIGS. 9 and 10.

It is to be understood that the present invention may be embodied with various other changes which may occur to those skilled in the art without departing from the spirit and scope of this invention.

What is claimed is:

1. A control apparatus for a vehicular automatic transmission which has a plurality of coupling elements which are selectively released and engaged to perform shifting actions, said control apparatus comprising:
 a shift control portion configured to control at least one specially controlled coupling element which is included in said plurality of coupling elements provided to perform shift-up actions of said vehicular automatic transmission and which is placed in a fully released state prior and subsequent to a first shift-up action performed according to a presently generated shifting command, said shift control portion controlling each of said at least one specially controlled coupling element so as to enable said each specially controlled coupling element to have a torque capacity by temporarily placing said at least one specially controlled coupling element in a slipping state during the first shift-up action between two gear positions adjoining each other performed according to the presently generated shifting command, wherein
 each of said at least one specially controlled coupling element is a higher-gear-position coupling element which is engaged to perform a second shift-up action of the vehicular automatic transmission to a higher gear position than a gear position established after said first shift-up action, and
 said shift control portion enables said at least one specially controlled coupling element to have the torque capacity in synchronization with a moment of initiation of an inertia phase of said vehicular automatic transmission, the moment of initiation of the inertia phase being determined based on a rotating speed of an input shaft of the vehicular automatic transmission.

2. The control apparatus according to claim 1 further comprising:
 a shifting progress determining portion configured to determine whether a degree of progress of the first shift-up action according to said presently generated shifting command has reached a predetermined target shifting progress degree,
 wherein said shift control portion controls said at least one specially controlled coupling element to reduce said torque capacity when said shifting progress determining portion has determined that the degree of progress of the first shift-up action has reached said predetermined target shifting progress degree.

3. The control apparatus according to claim 2, wherein said shifting progress determining portion determines that said degree of progress of the first shift-up action according to the presently generated shifting command has reached said predetermined target shifting progress degree when the rotating speed of an input shaft of said vehicular automatic transmission has reached a threshold value determined on the basis of the rotating speeds of the input shaft upon initiation and termination of the inertia phase of the first shift-up action such that the threshold value corresponds to said predetermined target shifting progress degree.

4. The control apparatus according to claim 3, wherein said predetermined target shifting progress degree is determined so that said degree of progress of the first shift-up action has reached said predetermined target shifting progress degree within said inertia phase.

5. The control apparatus according to claim 4, wherein said predetermined target shifting progress degree is determined so that said degree of progress of the first shift-up action has reached said predetermined target shifting progress degree after a change of a torque of an output shaft of said vehicular automatic transmission which takes place as a shifting shock of the vehicular automatic transmission upon or immediately after initiation of said inertia phase has been terminated.

6. The control apparatus according to claim 1, wherein the first shift-up action of said vehicular automatic transmission performed according to said presently generated shifting command is a shift-up action from a first gear position to a second gear position, the first shift-up action is performed by releasing a first coupling element which is included in said plurality of coupling elements and which has been placed in a fully engaged state to place said vehicular automatic transmission in said first gear position, and engaging a second coupling element which is included in said plurality of coupling elements and which has been placed in a fully released state in said first gear position of the vehicular automatic transmission, said shift control portion enabling said at least one specially controlled coupling element to have the torque capacity during said first shift-up action.

7. The control apparatus according to claim 1, wherein said shift control portion controls the torque capacity of said at least one specially controlled coupling element placed in said slipping state, and controls a torque capacity of the coupling element to be engaged to perform the first shift-up action according to said presently generated shifting command such that rotating speeds of an input shaft and an output shaft of the vehicular automatic transmission are changed at respective predetermined target rates.

8. The control apparatus according to claim 7, wherein the torque capacity of each of said plurality of coupling elements increases as an engaging action of said each coupling element progresses.

9. The control apparatus according to claim 1, wherein
 the plurality of coupling elements include a first coupling element that is engaged to establish a first gear position and a second coupling element that is engaged to establish a second gear position that adjoins the first gear position,
 the at least one specially controlled coupling element is an element that is engaged to establish a third gear position that is higher than the first and second gear positions, and
 the first shift-up action is a shift-up action from the first gear position to the second gear position and the at least one specially controlled coupling element is temporarily placed in the slipping state.

10. The control apparatus according to claim 9, wherein the at least one specially controlled coupling element is placed in the slipping state to coincide with the engagement of the second coupling element during the first shift-up action.

\* \* \* \* \*